United States Patent
Yamamoto et al.

(10) Patent No.: US 11,325,576 B2
(45) Date of Patent: May 10, 2022

(54) BRAKING CONTROL DEVICE FOR VEHICLE

(71) Applicant: ADVICS CO., LTD., Kariya (JP)

(72) Inventors: Takayuki Yamamoto, Nagakute (JP); Hiroyuki Kodama, Kariya (JP)

(73) Assignee: ADVICS CO., LTD., Kariya (JP)

( * ) Notice: Subject to any disclaimer, the term of this patent is extended or adjusted under 35 U.S.C. 154(b) by 87 days.

(21) Appl. No.: 16/754,329

(22) PCT Filed: Oct. 17, 2018

(86) PCT No.: PCT/JP2018/038578
§ 371 (c)(1),
(2) Date: Apr. 7, 2020

(87) PCT Pub. No.: WO2019/078228
PCT Pub. Date: Apr. 25, 2019

(65) Prior Publication Data
US 2020/0262407 A1 Aug. 20, 2020

(30) Foreign Application Priority Data
Oct. 17, 2017 (JP) .............................. JP2017-200698

(51) Int. Cl.
*B60T 8/17* (2006.01)
*B60T 13/68* (2006.01)
(Continued)

(52) U.S. Cl.
CPC .............. *B60T 13/686* (2013.01); *B60T 8/17* (2013.01); *B60T 7/042* (2013.01); *B60T 13/662* (2013.01);
(Continued)

(58) Field of Classification Search
CPC ...... B60T 13/14; B60T 13/148; B60T 13/586; B60T 13/686; B60T 2270/406
See application file for complete search history.

(56) References Cited

U.S. PATENT DOCUMENTS 10,029,663 B2 * 7/2018 Knechtges .............. B60T 13/66
2013/0127240 A1 5/2013 Noro et al.
(Continued)

FOREIGN PATENT DOCUMENTS

| JP | 2013107560 A | 6/2013 |
|---|---|---|
| JP | 5983871 B2 | 9/2016 |
| JP | 2017095023 A | 6/2017 |

OTHER PUBLICATIONS

International Search Report (PCT/ISA/210) dated Jan. 15, 2019, by the Japanese Patent Office as the International Searching Authority for International Application No. PCT/JP2018/038578.
(Continued)

*Primary Examiner* — Bradley T King
(74) *Attorney, Agent, or Firm* — Buchanan Ingersoll & Rooney PC

(57) ABSTRACT

A braking control device includes a first adjustment unit, a master unit, a regenerative coordination unit, a first opening/closing valve, a second opening/closing valve, a reaction force hydraulic pressure sensor, an input hydraulic pressure sensor, a controller. The master unit includes a master cylinder and a master piston, a master chamber, a servo chamber, and a reaction force chamber. The regenerative coordination unit includes an input piston. The first opening/closing valve provided in a first fluid passage. The second opening/closing valve provided in a second fluid passage. The reaction force hydraulic pressure sensor detects a pressure in the reaction force chamber. The input hydraulic pressure sensor detects a pressure in the input cylinder.
(Continued)

The controller determines, based on the reaction force hydraulic pressure and the input hydraulic pressure, suitability of at least one of the master unit, the regenerative coordination unit, the first opening/closing valve, and the second opening/closing valve.

2 Claims, 8 Drawing Sheets

(51) Int. Cl.
*B60T 7/04* (2006.01)
*B60T 13/66* (2006.01)
*B60T 13/74* (2006.01)

(52) U.S. Cl.
CPC ......... *B60T 13/745* (2013.01); *B60T 2220/04* (2013.01); *B60T 2270/82* (2013.01); *B60Y 2400/81* (2013.01)

(56) References Cited

U.S. PATENT DOCUMENTS

| | | | |
|---|---|---|---|
| 2015/0021976 A1* | 1/2015 | Miwa | B60T 13/586 303/6.01 |
| 2016/0096434 A1 | 4/2016 | Nakaoka et al. | |
| 2017/0001615 A1* | 1/2017 | Adler | B60T 7/042 |
| 2018/0354486 A1 | 12/2018 | Masuda et al. | |
| 2020/0247379 A1* | 8/2020 | Yamamoto | B60T 13/20 |
| 2021/0229648 A1* | 7/2021 | Yamamoto | B60T 13/586 |

OTHER PUBLICATIONS

Written Opinion (PCT/ISA/237) dated Jan. 15, 2019, by the Japanese Patent Office as the International Searching Authority for International Application No. PCT/JP2018/038578.

* cited by examiner

BRAKING CONTROL DEVICE FOR VEHICLE

TECHNICAL FIELD

The present disclosure relates to a braking control device for a vehicle.

BACKGROUND ART

PTL 1 discloses that "for improving accuracy of abnormality diagnosis", "there is provided an abnormality diagnosis device C, which is applied to a braking device A for a vehicle including low pressure sources 171 to 173 configured to communicate with a reaction force chamber R under predetermined situations, a master cylinder 1, a drive unit Y, and a control unit 61, comprising a diagnosis unit 62 configured to execute abnormality diagnosis based on at least one of a relation between an operating amount of a brake operation member 10 and a reaction force hydraulic pressure and a relation between a target value and an actual value, and a determination unit 63 configured to determine whether a state of the reaction force chamber R relating to at least one of a hydraulic pressure and a fluid amount is a predetermined insufficient state or a predetermined excessive state, wherein the diagnosis unit 62 stops the abnormality diagnosis when it is determined by the determination unit 63 that the state of the reaction force chamber R is the predetermined insufficient state or the predetermined excessive state".

Specifically, PTL 1 discloses that "the determination unit 63 checks (determines) a current opened/closed state of a second control valve 23 based on a control situation or opening/closing history of the control unit 61. The determination unit 63 acquires stroke information from a stroke sensor 71 (S102), and acquires reaction force hydraulic pressure information from a pressure sensor 73. Then, the determination unit 63 calculates/estimates a current amount of inflow/outflow of a fluid in the reaction force chamber R based on the opening/closing history, the stroke and the reaction force hydraulic pressure. The determination unit 63 determines whether the state of the reaction force chamber R is the predetermined insufficient state or the predetermined excessive state, based on a result of the calculation. When it is determined that the state of the reaction force chamber R is the predetermined insufficient state or the predetermined excessive state, the determination unit 63 transmits a diagnosis prohibition signal to the diagnosis unit 62, and the diagnosis unit 62 stops the abnormality diagnosis. On the other hand, when it is not determined that the state of the reaction force chamber R is the predetermined insufficient state or the predetermined excessive state, the determination unit 63 transmits a diagnosis permission signal to the diagnosis unit 62 and the diagnosis unit 62 executes the abnormality diagnosis". That is, the abnormality diagnosis (also referred to as "suitability determination") is executed, based on the stroke and the reaction force hydraulic pressure. However, it is further desired to improve accuracy of the suitability determination.

CITATION LIST

Patent Literature

PTL 1: JP-A-2017-95023

SUMMARY OF DISCLOSURE

Technical Problem

An object of the present disclosure is to provide a braking control device for a vehicle capable of improving accuracy of suitability determination for a device. In addition, an object of the present disclosure is to ensure redundancy of a braking control device.

Solution to Problem

A braking control device for a vehicle in accordance with the present disclosure is configured to adjust a braking hydraulic pressure (Pw) of a braking fluid (BF) in a wheel cylinder (CW) provided to a wheel (WH) of a vehicle in accordance with an operation on a braking operation member (BP) of the vehicle, and includes a first adjustment unit (YC) configured to adjust a hydraulic pressure generated by a first electric motor (MC, MZ, MD) to a first hydraulic pressure (Pc); a "master unit configured by a master cylinder (CM) and a master piston (PM), and having "a master chamber (Rm) connected to the wheel cylinder (CW)", "a servo chamber (Rs) into which the first hydraulic pressure (Pc) is introduced", and "a reaction force chamber (Ro) in which a reaction force hydraulic pressure (Ps) corresponding to an operation on the braking operation member (BP) is generated"; a "regenerative coordination unit (YK) configured by an input piston (PK) which is configured to operate in conjunction with the braking operation member (BP) and an input cylinder (CN) fixed to the master cylinder (CM), and a gap (Ks) between the master piston (PM) and the input piston (PK) being controlled by the first hydraulic pressure (Pc)"; a first opening/closing valve (VA) provided in a first fluid passage (HS) configured to interconnect the input cylinder (CN) and the reaction force chamber (Ro); a second opening/closing valve (VB) provided in a second fluid passage (HT) configured to interconnect the reaction force chamber (Ro) and a reservoir (RV) of the vehicle; a reaction force hydraulic pressure sensor (PS) configured to detect a hydraulic pressure in the reaction force chamber (Ro) as a reaction force hydraulic pressure (Ps); an input hydraulic pressure sensor (PN) configured to detect a hydraulic pressure in the input cylinder (CN) as an input hydraulic pressure (Pn); and a controller (ECU) configured to control the first electric motor (MC, MZ, MD), the first opening/closing valve (VA), and the second opening/closing valve (VB).

In the braking control device for a vehicle in accordance with the present disclosure, the controller (ECU) is configured to determine, based on the reaction force hydraulic pressure (Ps) and the input hydraulic pressure (Pn), suitability of at least one of the master unit (YM), the regenerative coordination unit (YK), the first opening/closing valve (VA), and the second opening/closing valve (VB). According to the above configuration, it is possible to appropriately determine introduction of gas into each unit, a seal defect, and an electromagnetic valve malfunction.

BRIEF DESCRIPTION OF DRAWINGS

FIG. 2 is a characteristic view for illustrating an operation characteristic in a malfunction state of a regenerative coordination unit YK and the like.

FIG. 4 is a time-series line diagram for illustrating a first suitability determination example of the regenerative coordination unit YK and the like.

FIG. 5 is a time-series line diagram for illustrating a second suitability determination example of the regenerative coordination unit YK and the like.

DESCRIPTION OF EMBODIMENTS

Figure 1:
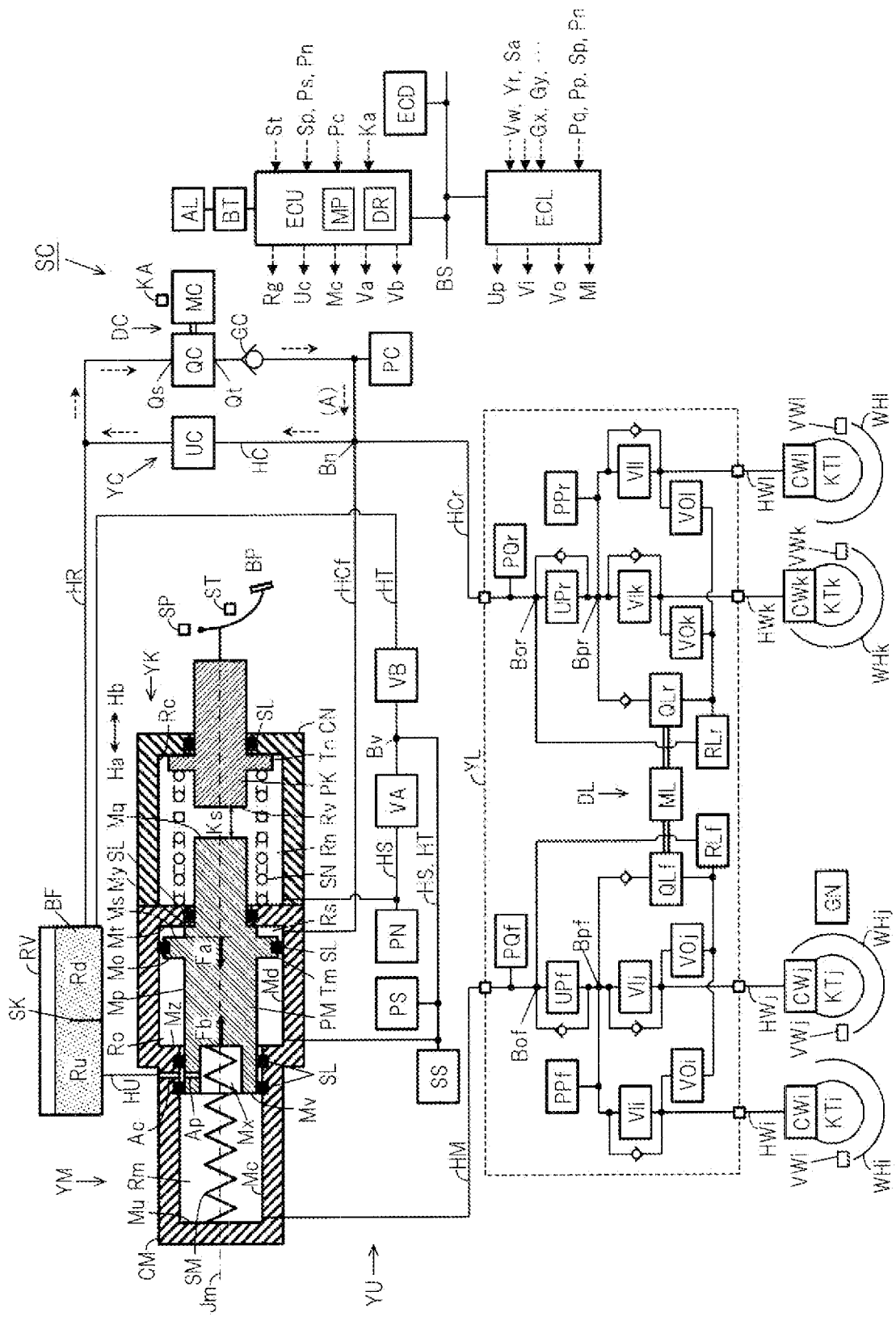
FIG. 1 is an overall configuration view for illustrating a first embodiment of a braking control device SC for a vehicle in accordance with the present disclosure.

<Reference Signs of Constitutional Members and the Like and Suffixes at the Ends of Reference Signs>

In descriptions below, a constitutional member, calculation processing, a signal, a characteristic and a value for which the same reference sign is added, such as "ECU", have the same function. The suffixes "i" to "l" added at the end of each reference sign are generic signs indicating which wheel each relates to. Specifically, "i" indicates a right front wheel, "j" indicates a left front wheel, "k" indicates a right rear wheel, and "l" indicates a left rear wheel. For example, for each of four wheel cylinders, a wheel cylinder CWi of the right front wheel, a wheel cylinder CWj of the left front wheel, a wheel cylinder CWk of the right rear wheel, and a wheel cylinder CWl of the left rear wheel are denoted. Also, the suffixes "i" to "l" at the ends of the signs may be omitted. In a case in which the suffixes "i" to "l" are omitted, each sign indicates a generic name of each of the four wheels. For example, "WH" indicates each wheel, and "CW" indicates each wheel cylinder.

The suffixes "1" and "2" added at the end of each sign are generic signs indicating which of two braking systems each relates to. Specifically, "1" indicates a first system, and "2" indicates a second system. For example, regarding a master cylinder chamber, a first master cylinder chamber Rm1, and a second master cylinder chamber Rm2 are denoted. Also, the suffixes "1" and "2" at the ends of the signs may be omitted. In a case in which the suffixes "1" and "2" are omitted, each sign indicates a generic name of each of the two braking systems. For example, "Rm" indicates a master cylinder chamber in each braking system.

In the two braking systems, in a case in which front and rear fluid passages are adopted, the suffixes "f" and "r" added at the end of each sign are generic signs indicating which system of the front and rear wheel systems each relates to, in the two braking systems. Specifically, "f" indicates a front wheel system, and "r" indicates a rear wheel system. For example, regarding the wheel cylinder, a wheel cylinder CWf of the front wheel, and a wheel cylinder CWr of the rear wheel are denoted. Also, the suffixes "f" and "r" at the ends of the signs may be omitted. In a case in which the suffixes "f" and "r" are omitted, each sign indicates a generic name of each of the two braking systems. For example, "CW" indicates a wheel cylinder of the front and rear braking systems.

In a case in which an actuation of the braking control device SC is in an appropriate state (or a partial malfunction state), braking performed by the braking control device SC is referred to as "control braking". In a case in which the actuation of the braking control device SC is in a complete malfunction state, braking only by a driver's operating force is referred to as "manual braking". Therefore, in the manual braking, the braking control device SC is not used.

<First Embodiment of Braking Control Device for Vehicle in Accordance with Present Disclosure>

A first embodiment of a braking control device SC in accordance with the present disclosure will be described with reference to an overall configuration view of FIG. 1. In a general vehicle, a two-system fluid passage is adopted, and redundancy is ensured. Herein, the fluid passage is a passage through which a braking fluid BF, which is an operating fluid of the braking control device, is to move, and includes a braking piping, a flow path of a fluid unit, a hose and the like. The fluid passage is filled therein with the braking fluid BF. A side of the two-system fluid passage close to a reservoir RV (a side distant from a wheel cylinder CW) is referred to as "upstream side", or "upper part", and a side close to a wheel cylinder CW (a side distant from the reservoir RV) is referred to as "downstream side", or "lower part".

In the first embodiment, a first system of the two-system fluid passage is a front wheel system, and is connected to wheel cylinders CWi and CWj (also denoted as "CWf") of the front wheels. Also, a second system of the two-system fluid passage is a rear wheel system, and is connected to wheel cylinders CWk and CWl (also denoted as "CWr") of the rear wheels. That is, as the fluid passages of the two systems, a so-called front and rear type ("H" type) is adopted.

The vehicle is a hybrid vehicle or an electric vehicle having a driving electric motor GN. The driving electric motor GN also functions as a generator for energy regeneration. For example, the driving motor GN is provided to the front wheel WHf. In the braking control device SC, so-called regenerative coordination control (coordination of regenerative braking and frictional braking) is executed. The vehicle having the braking control device SC is provided with a braking operation member BP, a wheel cylinder CW, a reservoir RV, and a wheel speed sensor VW.

The braking operation member (for example, a brake pedal) BP is a member that a driver operates so as to decelerate the vehicle. The braking operation member BP is operated, so that braking torque of the wheel WH is adjusted and a braking force is generated for the wheel WH. Specifically, a rotary member (for example, a brake disc) KT is fixed to the wheel WH of the vehicle. A brake caliper is arranged so as to sandwich the rotary member KT.

The brake caliper is provided with the wheel cylinder CW. A pressure (braking hydraulic pressure) Pw of the braking fluid BF in the wheel cylinder CW is increased, so that a friction member (for example, a brake pad) is pressed to the rotary member KT. Since the rotary member KT and the wheel WH are fixed so as to integrally rotate, braking torque (frictional braking force) is generated for the wheel WH by a friction force generated upon the pressing.

The reservoir (an atmospheric pressure reservoir) RV is a tank for actuation liquid, and the braking fluid BF is stored therein. An inside of the atmospheric pressure reservoir RV is divided into two parts Ru and Rd by a partitioning plate SK. A master reservoir chamber Ru is connected to a master cylinder chamber Rm. Also, an adjustment reservoir chamber Rd is connected to a first adjustment unit YC by a first reservoir fluid passage HR. In a state in which the braking fluid BF is filled in the reservoir RV, a fluid level of the braking fluid BF is higher than a height of the partitioning plate SK. For this reason, the braking fluid BF can freely move between the master reservoir chamber Ru and the adjustment reservoir chamber Rd over the partitioning plate SK. In the meantime, when an amount of the braking fluid BF in the reservoir RV decreases and the fluid level of the braking fluid BF becomes lower than the height of the partitioning plate SK, the master reservoir chamber Ru and the adjustment reservoir chamber Rd become independent fluid reservoirs, respectively.

Each wheel WH is provided with the wheel speed sensor VW so as to detect a wheel speed Vw. A signal of the wheel speed Vw is used for independent braking control of each wheel, such as antiskid control of suppressing lock tendency (excessive deceleration slip) of the wheel WH.

<<Braking Control Device SC>>

[Upper Fluid Unit YU]

The braking control device SC is configured by an upper fluid unit YU on a side close to the master cylinder CM and a lower fluid unit YL on a side close to the wheel cylinder CW. The upper fluid unit YU is configured by an operation displacement sensor SP, a reaction force hydraulic pressure sensor PS, an input hydraulic pressure sensor PN, an operation switch ST, a master unit YM, a first adjustment unit YC, a regenerative coordination unit YK, and an upper controller ECU.

The operation displacement sensor SP is provided so as to detect an operation displacement Sp of the braking operation member BP, as an operating amount of the braking operation member (brake pedal) BP. In addition to this, the reaction force hydraulic pressure sensor PS and the input hydraulic pressure sensor PN are provided so as to detect hydraulic pressures Ps (reaction force hydraulic pressure) and Pn (input hydraulic pressure) in a reaction force chamber Ro and an input chamber Rn, which will be described later, as the operating amount. As the braking operating amount, the reaction force hydraulic pressure Ps, the input hydraulic pressure Pn, and the braking operation displacement Sp are detected. In the meantime, in a case in which a first opening/closing valve VA, which will be described later, is closed and the input chamber Rn is sealed, the input hydraulic pressure Pn corresponds to an operating force Fp of the braking operation member BP.

The braking operation member BP is provided with the operation switch ST. By the operation switch ST, it is detected whether or not a driver's operation on the braking operation member BP is executed. When the braking operation member BP is not operated (i.e., at a time of non-braking), an off signal is output as an operation signal St by the braking operation switch ST. On the other hand, when the braking operation member BP is operated (i.e., at a time of braking), an on signal is output as the operation signal St.

[Master Unit YM (Single Type)]

A hydraulic pressure (front wheel braking hydraulic pressure) Pwf in the wheel cylinder CWf of the front wheel is adjusted via the master cylinder chamber Rm by the master unit YM. The master unit YM includes a master cylinder CM, a master piston PM, and a master elastic body SM.

The master cylinder CM is a bottomed cylinder member. The master piston PM is a piston member inserted inside of the master cylinder CM, and can move in conjunction with an operation on the braking operation member BP. An inside of the master cylinder CM is divided into three chambers (hydraulic pressure chambers) Rm, Rs and Ro by the master piston PM.

A first inner periphery part Mc of the master cylinder CM is formed with grooves, and two seals SL are fitted in the grooves. An outer periphery part (a cylindrical outer peripheral surface) Mp of the master piston PM and the first inner periphery part (a cylindrical inner peripheral surface) of the master cylinder CM are sealed by the two seals SL. The master piston PM can smoothly move along a central axis Jm of the master cylinder CM.

The master cylinder chamber (also simply referred to as "master chamber") Rm is a hydraulic pressure chamber defined by "the first inner periphery part Mc and a first bottom part (bottom surface) Mu of the master cylinder CM" and a first end portion My of the master piston PM. The master chamber Rm is connected to a master cylinder fluid passage HM, and is finally connected to the wheel cylinder CWf of the front wheel via the lower fluid unit YL. In the first embodiment, the master cylinder CM is not provided with a master cylinder chamber for the wheel cylinder CWr of the rear wheel. The master cylinder CM is referred to as "single type".

The master piston PM is provided with a flange Tm. By the flange Tm, an inside of the master cylinder CM is partitioned into a servo hydraulic pressure chamber (also simply referred to as "servo chamber") Rs and a reaction force hydraulic pressure chamber (also simply referred to as "reaction force chamber") Ro. An outer periphery part of the flange Tm is provided with a seal SL, so that the flange Tm and a second inner periphery part Md of the master cylinder CM are sealed. The servo chamber Rs is a hydraulic pressure chamber defined by "the second inner periphery part Md and a second bottom part (bottom surface) Mt of the master cylinder CM" and a first surface Ms of the flange Tm of the master piston PM. The master chamber Rm and the servo chamber Rs are arranged to face each other with the master piston PM being interposed therebetween. The servo chamber Rs is connected to a front wheel adjustment fluid passage HCf and an adjustment hydraulic pressure Pc (corresponding to "a first hydraulic pressure") is introduced (supplied) therein from the adjustment unit YC.

The reaction force chamber (reaction force hydraulic pressure chamber) Ro is a hydraulic pressure chamber defined by the second inner periphery part Md of the master cylinder CM, a step part Mz and a second surface Mo of the flange Tm of the master piston PM. The reaction force hydraulic pressure chamber Ro is sandwiched and located between the master hydraulic pressure chamber Rm and the servo hydraulic pressure chamber Rs in a direction of the central axis Jm. A hydraulic pressure (reaction force hydraulic pressure) Ps in the reaction force chamber Ro is generated by a stroke simulator SS in accordance with an operation on the braking operation member BP. The reaction force chamber Ro is connected to a reaction force chamber fluid passage HS. A fluid amount of the braking fluid BF in the upper fluid unit YU is regulated by the reaction force chamber Ro.

The first end portion My of the master piston PM is provided with a concave portion Mx. The master elastic body (for example, a compression spring) SM is provided between the concave portion Mx and the first bottom part Mu of the master cylinder CM. The master elastic body SM presses the master piston PM against the second bottom part Mt of the master cylinder CM in the direction of the central axis Jm of the master cylinder CM. At a time of non-braking, a step part My of the master piston PM and the second bottom part Mt of the master cylinder CM are in contact with each other. In this state, a position of the master piston PM is referred to as "initial position of the master unit YM".

The master cylinder CM is provided with a through-hole Ac between the two seals SL (for example, cup seals). The through-hole Ac connects to the master reservoir chamber Ru via a supply fluid passage HU. Also, a through-hole Ap is provided in the vicinity of the first end portion My of the master piston PM. When the master piston PM is located in the initial position, the master chamber Rm is in a communication state with the reservoir RV (particularly, the master reservoir chamber Ru) via the through-holes Ac and Ap and the supply fluid passage HU.

The master chamber Rm applies an urging force Fb (referred to as "backward force") in a backward direction Hb along the central axis Jm to the master piston PM by a master cylinder hydraulic pressure (also simply referred to as "master hydraulic pressure") Pm. The servo chamber (servo hydraulic pressure chamber) Rs applies an urging force Fa (referred to as "forward force") facing the backward force Fb to the master piston PM by an inside pressure thereof (i.e., the adjustment hydraulic pressure Pc). That is, in the master piston PM, the forward force Fa by the hydraulic pressure Pv (=Pc) in the servo chamber Rs and the backward force Fb by the hydraulic pressure (master hydraulic pressure) Pm in the master chamber Rm oppose (face) each other in the direction of the central axis Jm of the master cylinder CM and are statically balanced.

[First Adjustment Unit YC (Reflux Type)]

By the first adjustment unit YC, the hydraulic pressure Pm in the master chamber Rm and a hydraulic pressure (rear wheel braking hydraulic pressure) Pwr in the wheel cylinder CWr of the rear wheel are adjusted. The first adjustment unit YC includes a first electric pump DC, a check valve GC, a first adjustment valve UC and an adjustment hydraulic pressure sensor PC. In the first adjustment unit YC, the braking fluid BF that is discharged by the first electric pump DC is adjusted to the adjustment hydraulic pressure Pc by the first adjustment valve UC. The adjustment hydraulic pressure Pc (first hydraulic pressure) is applied to the master unit YM (particularly, the servo chamber Rs) and the wheel cylinder CWr of the rear wheel.

The first electric pump DC for reflux is configured by a set of one first electric motor MC and one first fluid pump QC. In the first electric pump DC, the electric motor MC and the fluid pump QC are fixed so that the first electric motor MC and the first fluid pump QC are to integrally rotate. The electric pump DC for reflux (particularly, the first electric motor MC) is a power source for adjusting the hydraulic pressure (braking hydraulic pressure) Pw in the wheel cylinder CW at a time of control braking. The first electric motor MC is controlled by the upper controller ECU, based on a drive signal Mc.

For example, a three-phase brushless motor is adopted as the first electric motor MC. The brushless motor MC is provided with a rotation angle sensor KA configured to detect a rotor position (rotation angle) Ka. Based on the motor-rotation angle (actual value) Ka, a switching element of a bridge circuit is controlled, and the electric motor MC is driven. That is, directions (i.e., excitation directions) of energization amounts of coils of three phases (U-phase, V-phase and W-phase) are sequentially switched, so that the brushless motor MC is rotatively driven. In the meantime, the first electric motor MC may also be a motor with a brush.

The first reservoir fluid passage HR is connected to a suction opening Qs of the first fluid pump QC. Also, the adjustment fluid passage HC is connected to a discharge opening Qt of the fluid pump QC. When the electric pump DC (particularly, the fluid pump QC) is driven, the braking fluid BF is sucked from the first reservoir fluid passage HR through the suction opening Qs, and is discharged from the discharge opening Qt to the adjustment fluid passage HC. A gear pump is adopted as the first fluid pump QC, for example.

The check valve GC is provided on the way of the adjustment fluid passage HC. For example, the check valve GC is provided in the vicinity of the discharge opening Qt of the first fluid pump QC. With the check valve GC, the braking fluid BF can move from the first reservoir fluid passage HR toward the adjustment fluid passage HC but is prevented from moving from the adjustment fluid passage HC toward the first reservoir fluid passage HR (i.e., backflow of the braking fluid BF). That is, the first electric pump DC is configured to rotate only in one direction.

The first adjustment valve UC is connected to the adjustment fluid passage HC and the first reservoir fluid passage HR. The first adjustment valve UC is a linear electromagnetic valve (also referred to as "proportional valve" or "differential pressure valve") of which a valve opening amount (lift amount) is continuously controlled based on an energization state (for example, supply current). The adjustment valve UC is controlled by the upper controller ECU, based on a drive signal Uc. As the first adjustment valve UC, a normally open electromagnetic valve is adopted.

The braking fluid BF is pumped up from the first reservoir fluid passage HR through the suction opening Qs of the first fluid pump QC, and is discharged from the discharge opening Qt. Then, the braking fluid BF passes through the check valve GC and the first adjustment valve UC, and returns to the first reservoir fluid passage HR. In other words, a reflux path (a fluid passage through which the flow of the braking fluid BF returns to its original flow) is formed by the first reservoir fluid passage HR and the adjustment fluid passage HC, and the check valve GC and the adjustment valve UC are provided on the way of the reflux path.

While the first electric pump DC is actuated, the braking fluid BF flows back in order of "HR→QC(Qs→Qt)→GC→UC→HR", as shown with a broken arrow (A). When the first adjustment valve UC is in a completely opened state (at a time of non-braking because the valve is a normally open type), the hydraulic pressure (adjustment hydraulic pressure) Pc in the adjustment fluid passage HC is low and is substantially "0 (atmospheric pressure)". When an energization amount to the first adjustment valve UC is increased and the reflux path is narrowed by the adjustment valve UC, the adjustment hydraulic pressure Pc is increased. This adjustment method is referred to as "reflux type". In the first adjustment unit YC, the adjustment hydraulic pressure sensor (first hydraulic pressure sensor) PC is provided on the adjustment fluid passage HC (particularly, between the check valve GC and the adjustment valve UC) so as to detect the adjustment hydraulic pressure (first hydraulic pressure) Pc.

The adjustment fluid passage HC is branched (split) to a front wheel adjustment fluid passage HCf and a rear wheel adjustment fluid passage HCr at a part Bn. The front wheel adjustment fluid passage HCf is connected to the servo chamber Rs, so that the adjustment hydraulic pressure Pc is supplied to the servo chamber Rs. Also, the rear wheel adjustment fluid passage HCr is connected to the lower fluid unit YL and is finally connected to the wheel cylinder CWr (CWk, CWl) of the rear wheel. Therefore, the adjustment hydraulic pressure Pc is introduced into the wheel cylinder CWr of the rear wheel. The hydraulic pressure Pwr in the wheel cylinder CWr of the rear wheel is directly controlled by the adjustment unit YC without via the master cylinder CM. Since a master cylinder chamber for a rear wheel is omitted, a size of the master cylinder CM in the direction of the central axis Jm can be shortened.

[Regenerative Coordination Unit YK]

The regenerative coordination unit YK implements coordination control of frictional braking and regenerative braking. That is, a situation in which the braking operation member BP is operated but the braking hydraulic pressure Pw is not generated is made by the regenerative coordination unit YK. The regenerative coordination unit YK is configured by an input cylinder CN, an input piston PK, an input elastic body SN, a first opening/closing valve VA, a stroke simulator SS, a second opening/closing valve VB, a reaction force hydraulic pressure sensor PS, and an input hydraulic pressure sensor PN.

The input cylinder CN is a bottomed cylinder member fixed to the master cylinder CM. The input piston PK is a piston member inserted inside of the input cylinder CN (the input chamber Rn). The input piston PK is mechanically connected to the braking operation member BP via a clevis (U-shaped link) so as to operate in conjunction with the braking operation member BP. The input piston PK is provided with a flange Tn. The input elastic body (for example, a compression spring) SN is provided between an attachment surface of the input cylinder CN to the master cylinder CM and the flange Tn of the input piston PK. The input elastic body SN presses the flange Tn of the input piston PK against a bottom part of the input cylinder CN in the direction of the central axis Jm.

At a time of non-braking, the step part My of the master piston PM is in contact with the second bottom part Mt of the master cylinder CM, and the flange Tn of the input piston PK is in contact with the bottom part of the input cylinder CN. At a time of non-braking, a gap Ks between the master piston PM (particularly, an end face Mq) and the input piston PK (particularly, an end face Rv) is set to a predetermined distance ks (referred to as "initial gap") inside of the input cylinder CN. That is, when each of the pistons PM and PK is located in a position of the most backward direction Hb (referred to as "initial position" of each piston) (i.e., at a time of non-braking), the master piston PM and the input piston PK are spaced by the predetermined distance ks. Herein, the predetermined distance ks corresponds to a maximum value of an amount of regeneration Rg. When the regenerative coordination control is executed, the gap (also referred to as "spacing displacement") Ks is controlled (regulated) by the adjustment hydraulic pressure Pc.

The input cylinder CN (i.e., the input chamber Rn) is connected to the reaction force chamber Ro via the reaction force chamber fluid passage HS (corresponding to "a first fluid passage"). The reaction force chamber fluid passage HS is provided with the first opening/closing valve VA. The first opening/closing valve VA is a two-position electromagnetic valve (also referred to as "on/off valve") having an opened position (communication state) and a closed position (cutoff state). The first opening/closing valve VA is controlled by the upper controller ECU, based on a drive signal Va. As the first opening/closing valve VA, a normally closed electromagnetic valve is adopted.

The stroke simulator (also simply referred to as "simulator") SS is provided on the reaction force chamber fluid passage HS (particularly, between the reaction force chamber Ro and the first opening/closing valve VA). With the simulator SS, when the regenerative coordination control is executed, a reaction force hydraulic pressure Ps corresponding to an operation on the braking operation member BP is generated and an operating force Fp of the braking operation member BP is generated. In the simulator SS, a piston and an elastic body (for example, a compression spring) are provided. The braking fluid BF moves from the input cylinder CN to the simulator SS, so that the piston is pushed by the inflow braking fluid BF. A force is applied to the piston in a direction of preventing the inflow of the braking fluid BF by the elastic body. The operating force Fp when the braking operation member BP is operated is formed by the elastic body.

The reaction force chamber Ro is connected to the reservoir RV (particularly, the adjustment reservoir chamber Rd) via a second reservoir fluid passage HT (corresponding to "second fluid passage"). The second reservoir fluid passage HT is provided with the second opening/closing valve VB. The second opening/closing valve VB is a two-position electromagnetic valve (an on/off valve) having an opened position (communication state) and a closed position (cutoff state). The second opening/closing valve VB is controlled by the upper controller ECU, based on a drive signal Vb. As the second opening/closing valve VB, a normally open electromagnetic valve is adopted. In the drawing, the reaction force chamber fluid passage (first fluid passage) HS and the second reservoir fluid passage (second fluid passage) HT are overlapped form the reaction force chamber Ro to a part By (a part between the first opening/closing valve VA and the second opening/closing valve VB). However, the overlapping part may not be provided.

A part of the second reservoir fluid passage HT may be shared with the first reservoir fluid passage HR. However, the first reservoir fluid passage HR and the second reservoir fluid passage HT are preferably individually connected to the reservoir RV. The first fluid pump QC is configured to suck the braking fluid BF from the reservoir RV via the first reservoir fluid passage HR. However, at this time, air bubbles may be introduced into the first reservoir fluid passage HR. For this reason, in order to prevent the air bubbles from being introduced into the input cylinder CN and the like, the second reservoir fluid passage HT has no part that is shared with the first reservoir fluid passage HR, and is connected to the reservoir RV separately from the first reservoir fluid passage HR.

In order to detect the hydraulic pressure (reaction force hydraulic pressure) Ps in the reaction force chamber Ro of the master unit YM, the reaction force hydraulic pressure sensor PS is provided. The reaction force hydraulic pressure sensor PS may be arranged on the reaction force chamber fluid passage HS between the reaction force chamber Ro and the second opening/closing valve VB. Also, in order to detect a hydraulic pressure (input hydraulic pressure) Pn in the input chamber Rn of the input cylinder CN, the input hydraulic pressure sensor PN is provided. The input hydraulic pressure sensor PN may be arranged on the second reservoir fluid passage HT between the input chamber Rn and the first opening/closing valve VA. The detected hydraulic pressures Ps and Pn are input to the upper controller ECU. In the meantime, when the first opening/closing valve VA is located in an opened position, a detection value Ps of the reaction force hydraulic pressure sensor PS and a detection value Pn of the input hydraulic pressure sensor PN are the same.

[Upper Controller ECU]

The upper controller (also referred to as "electronic control unit") ECU is configured by an electric circuit board on which a microprocessor MP and the like are mounted, and a control algorithm programmed in the microprocessor MP. The upper controller ECU is input with a braking operation displacement Sp, a braking operation signal St, a reaction force hydraulic pressure Ps, an input hydraulic pressure Pn, an adjustment hydraulic pressure Pc, and a rotation angle Ka. The upper controller ECU controls the electric motor MC and the three types of different electromagnetic valves VA, VB and UC, based on the signals (Sp and the like).

Specifically, drive signals Va, Vb and Uc for controlling the diverse electromagnetic valves VA, VB and UC are calculated based on the control algorithm in the microprocessor MP. Similarly, a drive signal Mc for controlling the electric motor MC is calculated. Then, the electromagnetic valves VA, VB and UC and the electric motor MC are driven based on the drive signals Va, Vb, Uc and Mc.

The upper controller ECU is connected to the lower controller ECL and a controller (electronic control unit) of the other system in a network manner via an in-vehicle communication bus BS. In order to execute the regenerative coordination control, an amount of regeneration Rg (target value) is transmitted from the upper controller ECU to a driving controller ECD via the communication bus BS. The "amount of regeneration Rg" is a state quantity (target value) indicative of a magnitude of regenerative braking that is generated by the driving motor (which is also a generator for regeneration) GN. Based on the target value Rg of the amount of regeneration, the generator for regeneration GN is controlled and the regenerative braking is performed by the driving controller ECD. Each of the controllers ECU, ECL and ECD is fed with power from an in-vehicle generator AL and an accumulator BT.

The upper controller ECU is provided with a drive circuit DR so as to drive the electromagnetic valves VA, VB and UC and the electric motor MC. The drive circuit DR is formed with a bridge circuit by switching elements (power semiconductor devices such as a MOS-FET, an IGBT and the like) so as to drive the electric motor MC. Based on the motor drive signal Mc, an energization state of each switching element is controlled, and an output of the electric motor MC is controlled. Also, the drive circuit DR controls energization states (i.e., excitation states) of the electromagnetic valves VA, VB and UC, based on the drive signals Va, Vb and Uc, so as to drive the same. In the meantime, the drive circuit DR is provided with an energization amount sensor configured to detect actual energization amounts of the electric motor MC and the electromagnetic valves VA, VB and UC. For example, as the energization amount sensor, a current sensor is provided to detect supply currents to the electric motor MC and the electromagnetic valves VA, VB and UC.

[Actuation of Upper Fluid Unit YU]

At a time of non-braking (for example, when the braking operation member BP is not operated), the energization to the electric motor MC and the electromagnetic valves VA, VB and UC is not performed. For this reason, the electric motor MC is stopped, the first opening/closing valve VA is located in the closed position, the second opening/closing valve VB is located in the opened position, and the first adjustment valve UC is located in the opened position.

At a time of control braking when the braking control device SC is appropriately actuated, the first and second opening/closing valves VA and VB are energized, the first opening/closing valve VA is located in the opened position, and the second opening/closing valve VB is located in the closed position. The first opening/closing valve VA is located in the opened position, so that the input chamber Rn and the reaction force chamber Ro are connected to each other and the simulator SS is connected to the input chamber Rn. Also, the second opening/closing valve VB is located in the closed position, so that the connection between the simulator SS and the reservoir RV is cut off.

When the braking operation member BP is operated, the input piston PK is moved in the forward direction Ha. By the movement, a fluid amount flowing out from the input chamber Rn flows into the simulator SS, so that the reaction force hydraulic pressure Ps is generated and a braking operating force Fp is formed in the reaction force chamber Ro and the input chamber Rn.

The adjustment hydraulic pressure Pc (first hydraulic pressure) is increased by the first adjustment unit YC, in accordance with the operation on the braking operation member BP. The adjustment hydraulic pressure Pc is supplied into the servo chamber Rs via the front wheel adjustment fluid passage HCf. Due to the adjustment hydraulic pressure Pc, the force (forward force) Fa in the forward direction (a leftward direction in the drawing) Ha is applied to the master piston PM. When the forward force Fa becomes higher than an attaching load (set load) of the master elastic body SM, the master piston PM is moved along the central axis Jm. By the forward movement, when the through-hole Ap passes through the seal SL, the master chamber Rm is cut off from the reservoir RV (particularly, the master reservoir chamber Ru) and the master chamber Rm is in a liquid-tight state. Also, when the adjustment hydraulic pressure Pc is increased, the braking fluid BF is pneumatically transported from the master chamber Rm toward the wheel cylinder CWf (CWi, CWj) of the front wheel by the master hydraulic pressure Pm. The master piston PM is applied with the force (backward force) Fb in the backward direction Hb by the master hydraulic pressure Pm (=Pwf). The servo chamber Rs generates the force (forward force) Fa in the forward direction Ha by the servo hydraulic pressure Pv (=Pc) so as to oppose (face) the backward force Fb. For this reason, the master hydraulic pressure Pm is increased or decreased, in accordance with the increase or decrease in the adjustment hydraulic pressure Pc.

The adjustment hydraulic pressure Pc is applied to the wheel cylinder CWr (CWk, CWl) of the rear wheel through the rear wheel adjustment fluid passage HCr without via the master cylinder CM. The braking hydraulic pressure Pwr in the wheel cylinder CWr of the rear wheel is directly increased or decreased by the adjustment hydraulic pressure Pc.

When the braking operation member BP is returned, the adjustment hydraulic pressure Pc is reduced by the adjustment unit YC. Then, the servo hydraulic pressure Pv (=Pc) becomes lower than the hydraulic pressure Pm (=Pwf) in the master chamber and the master piston PM is moved in the backward direction (a rightward direction in the drawing) Hb. When the braking operation member BP is set to a non-operation state, the master piston PM (particularly, the step part My) is returned to the initial position in which it is in contact with the second bottom part Mt of the master cylinder CM by the elastic force of the compression spring SM.

A sectional area am of an end portion Mq of the master piston PM is set to be the same as an area ao of the second surface Mo of the flange Tm so that a change in volume caused in accordance with the movement of the master piston PM is absorbed. When the regenerative coordination control is executed, the first opening/closing valve VA is located in the opened position and the second opening/closing valve VB is located in the closed position. Therefore, the input chamber Rn and the reaction force chamber Ro are connected to each other by the second reservoir fluid passage HT and the reaction force chamber fluid passage HS. When the master piston PM is moved in the forward direction Ha, a volume in the input chamber Rn is increased by an amount of the movement. However, since "am=ao", the braking fluid BF corresponding to the increase in volume is all moved from the reaction force chamber Ro into the input chamber Rn. In other words, there is no excess or deficiency in balance of the fluid amount accompanied by the movement of the master piston PM. Therefore, an amount (volume) of the braking fluid BF flowing into the simulator SS or flowing out from the simulator SS depends on only the movement of the input piston PK.

At a time of manual braking in which the braking control device SC is completely stopped, the first and second opening/closing valves VA and VB are not energized, the first opening/closing valve VA is located in the closed position, and the second opening/closing valve VB is located in the opened position. The first opening/closing valve VA is located in the closed position, so that the input chamber Rn is in a fluid lock state (seal state) and the input piston PK and the master piston PM cannot relatively move. Also, the second opening/closing valve VB is located in the opened position, so that the reaction force chamber Ro is fluidly connected to the reservoir RV through the second reservoir fluid passage HT. For this reason, while the volume of the reaction force chamber Ro is decreased due to the movement of the master piston PM in the forward direction Ha, the fluid amount corresponding to the decrease in volume is discharged toward the reservoir RV. As the braking operation member BP is operated, the input piston PK and the master piston PM are integrally moved, so that the braking fluid BF is pneumatically transported from the master chamber Rm.

[Lower Fluid Unit YL]

The lower fluid unit YL (corresponding to "a second adjustment unit") is controlled by the lower controller ECL. The lower controller ECL is connected to the upper controller ECU via the communication bus BS so as to share the signals and the calculation values. The lower controller ECL is input with a wheel speed Vw, a yaw rate Yr, a steering angle Sa, a longitudinal acceleration Gx, a lateral acceleration Gy, an upper hydraulic pressure Pq, a lower hydraulic pressure Pp, an input hydraulic pressure Pn, and an operation displacement Sp, as detection signals of the diverse sensors (VW and the like). In the controller ECL, a vehicle body speed Vx is calculated based on the wheel speed Vw.

For example, the lower fluid unit YL executes antiskid control so as to suppress excessive deceleration slip (for example, wheel lock) of the wheel WH, based on the wheel speed Vw. In the antiskid control, the vehicle body speed Vx is first calculated based on the wheel speed Vw. Based on the wheel speed Vw and the vehicle body speed Vx, a deceleration slip Sw of each wheel WH (for example, a difference between the wheel speed Vx and the vehicle body speed Vw) is calculated. When the wheel slip Sw becomes excessive and exceeds a threshold value sx, the braking hydraulic pressure Pw is reduced by electromagnetic valves VI and VO, which will be described later. Also, when the wheel slip Sw becomes less than a threshold value sy and grip of the wheel WH is recovered, the braking hydraulic pressure Pw is increased by the electromagnetic valves VI and VO.

Also, the lower fluid unit YL executes vehicle stabilization control (so-called ESC) for suppressing unstable behaviors (excessive over-steer behavior and under-steer behavior) of the vehicle, based on the actual yaw rate Yr. In the vehicle stabilization control, a target yaw rate Yt is first calculated based on the vehicle body speed Vx and the steering angle Sa. A deviation hY between the target yaw rate Yt and the actual yaw rate Yr (detection value) is calculated. Then, based on the yaw rate deviation hY, an excessive over-steer behavior and an excessive under-steer behavior are determined. Based on a result of the determination, the braking hydraulic pressure Pw of each wheel is independently controlled, so that the vehicle is decelerated and yaw moment of stabilizing the vehicle is formed. As described above, the lower fluid unit YL executes independent braking control on each wheel, based on the signals (Vw, Yr and the like).

In addition, when a part of the braking control device SC (for example, at least one of the regenerative coordination unit YK, the first opening/closing valve VA and the second opening/closing valve VB) malfunctions, a second hydraulic pressure Pp is generated from the lower fluid unit YL (second adjustment unit) so that the control braking is continuously performed, instead of the first adjustment unit YC (i.e., the first hydraulic pressure Pc). That is, the redundancy of the braking control device SC is ensured by the lower fluid unit YL.

The upper fluid unit YU and the lower fluid unit YL are connected to each other via the master cylinder fluid passage HM and the rear wheel adjustment fluid passage HCr. The lower fluid unit YL is configured by a second electric pump DL, "front wheel and rear wheel low-pressure reservoirs RLf and RLr", "front wheel and rear wheel charge valves UPf and UPr (corresponding to "a second adjustment valve")", "front wheel and rear wheel upper hydraulic pressure sensors PQf and PQr", "front wheel and rear wheel lower hydraulic pressure sensors PPf and PPr", an "inlet valve VI", and an "outlet valve VO".

The second electric pump DL is configured by one second electric motor ML and two second fluid pumps QLf and QLr. The second electric motor ML is controlled by the lower controller ECL, based on a drive signal Ml. The two second fluid pumps QLf and QLr for front and rear wheels are integrally rotated and driven by the electric motor ML. The braking fluid BF is pumped up from upstream parts Bof and Bor of the front wheel and rear wheel charge valves (also referred to as "charge-over valve") UPf and UPr and is discharged to downstream parts Bpf and Bpr of the charge valves UPf and UPr by the front wheel and rear wheel second fluid pumps QLf and QLr of the second electric pump DL. The front wheel and rear wheel low-pressure reservoirs RLf and RLr are provided on a suction-side of the front wheel and rear wheel fluid pumps QLf and QLr.

As with the first adjustment valve UC, as the second adjustment valve UP (a generic name of the charge valves UPf and UPr), a normally open linear adjustment valve (an electromagnetic valve of which a valve opening amount is continuously controlled in accordance with an energization state) is adopted. The second adjustment valve UP is controlled by the lower controller ECL, based on a drive signal Up (Upf, Upr).

When the front wheel second fluid pump QLf is driven, a reflux of "Bof→RLf→QLf→Bpf→UPf→Bof" (a flow of the circulating braking fluid BF) is formed. A hydraulic pressure (referred to as "lower hydraulic pressure" and corresponding to "a second hydraulic pressure") Ppf of the downstream part of the front wheel charge valve (front wheel second adjustment valve) UPf is regulated by the front wheel charge valve UPf provided on the master cylinder fluid passage HM. The braking fluid BF is moved from the upstream part Bof toward the downstream part Bpf of the front wheel charge valve UPf by the front wheel second fluid pump QLf, and a differential pressure (Ppf>Pqf) between an upper hydraulic pressure Pqf of the upstream part of the charge valve UPf and a lower hydraulic pressure Ppf of the downstream part of the charge valve UPf is adjusted by the front wheel charge valve UPf (throttle of the valve opening portion).

As with, a reflux of "Bor→RLr→QLr→Bpr→UPr→Bor" is formed by drive of the rear wheel second fluid pump QLr. A hydraulic pressure (which is a lower hydraulic pressure and corresponds to "a second hydraulic pressure") Ppr of the downstream part of the rear wheel charge valve UPr is regulated by the rear wheel charge valve UPr provided on the rear wheel adjustment fluid passage HCr. That is, the braking fluid BF is moved from the upper part Bor toward the lower part Bpr of the rear wheel charge valve (rear wheel second adjustment valve) UPr by the rear wheel second fluid pump QLr, and a differential pressure (Ppr>Pqr) between an upper hydraulic pressure Pqr on the upstream side of the charge valve UPr and a lower hydraulic pressure Ppr on a downstream side of the charge valve UPr is adjusted by the rear wheel charge valve UPr.

The front wheel and rear wheel upper hydraulic pressure sensors PQf and PQr are provided so as to detect the upper hydraulic pressures Pqf and Pqr of the front and rear wheels. Also, the front wheel and rear wheel lower hydraulic pressure sensors PPf and PPr (second hydraulic pressure sensor) are provided so as to detect the lower hydraulic pressures (second hydraulic pressure) Ppf and Ppr of the front and rear wheels. The detected hydraulic pressure signals Pq and Pp are input to the lower controller ECL. In the meantime, at least one of the four hydraulic pressure sensors PQf, PQr, PPf and PPr may be omitted.

The master cylinder fluid passage HM is branched (split) into wheel cylinder fluid passages HWi and HWj of the respective front wheels at a front wheel branching part Bpf on a downstream side of the front wheel charge valve UPf. As with, the rear wheel adjustment fluid passage HCr is branched into wheel cylinder fluid passages HWk and HWl of the respective rear wheels at a rear wheel branching part Bpr on a downstream side of the rear wheel charge valve UPr.

The wheel cylinder fluid passage HW is provided with an inlet valve VI and an outlet valve VO. As the inlet valve VI, a normally open on/off electromagnetic valve is adopted. Also, as the outlet valve VO, a normally closed on/off electromagnetic valve is adopted. The electromagnetic valves VI and VO are controlled by the lower controller ECL, based on drive signals Vi and Vo. The braking hydraulic pressure Pw of each wheel can be independently controlled by the inlet valve VI and the outlet valve VO. In the meantime, when the inlet valve VI and the outlet valve VO are not driven, the front wheel braking hydraulic pressure Pwf (Pwi, Pwj) is the same as the front wheel lower hydraulic pressure Ppf and the rear wheel braking hydraulic pressure Pwr (Pwk, Pwl) is the same as the rear wheel lower hydraulic pressure Ppr.

The normally open inlet valve VI is provided on the way of the wheel cylinder fluid passage HW (a fluid passage interconnecting the branching part Bp and the wheel cylinder CW). The wheel cylinder fluid passage HW is connected to the low-pressure reservoir RL via the normally closed outlet valve VO at a downstream part of the inlet valve VI. For example, in the antiskid control, the inlet valve VI is located in the closed position and the outlet valve VO is located in the opened position so as to reduce the hydraulic pressure Pw in the wheel cylinder CW. The inflow of the braking fluid BF into the inlet valve VI is blocked, the braking fluid BF in the wheel cylinder CW flows out toward the low-pressure reservoir RL, and the braking hydraulic pressure Pw is thus reduced. Also, in order to increase the braking hydraulic pressure Pw, the inlet valve VI is located in the opened position and the outlet valve VO is located in the closed position. The outflow of the braking fluid BF toward the low-pressure reservoir RL is blocked, the lower hydraulic pressure Pp through the charge valve UP is introduced into the wheel cylinder CW, and the braking hydraulic pressure Pw is thus increased.

<Operation Characteristic Upon Malfunction>

Figure 2:
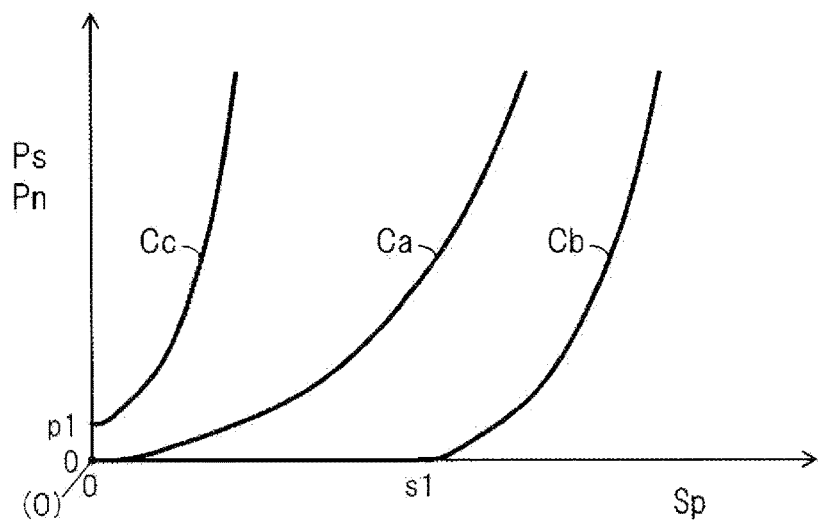

An operation characteristic of the braking operation member BP when at least one of the regenerative coordination unit YK, the master unit YM, the first opening/closing valve VA and the second opening/closing valve VB malfunctions is described with reference to a characteristic diagram of FIG. 2. Herein, the operation characteristic is a relation between the operation displacement Sp of the braking operation member BP and the operating force Fp of the braking operation member BP. Since the operating force Fp of the braking operation member BP is formed by the reaction force hydraulic pressure Ps (=Pn), a relation between the operation displacement Sp and the reaction force hydraulic pressure Ps and input hydraulic pressure Pn is exemplified.

A characteristic Ca corresponds to a case in which the braking control device SC is all appropriately actuated. The characteristic Ca is referred to as "reference characteristic" and is formed by the simulator SS. In a case of a vehicle without the simulator SS, the operation characteristic of the braking operation member BP is determined by stiffness of a braking device (for example, stiffness of a caliper, stiffness of a friction material, stiffness of a braking piping), and the like. In order to match the operation characteristic, the relation between the operation displacement Sp and the reaction force hydraulic pressure Ps is set as a downwardly convex non-linear characteristic, in the simulator SS.

A characteristic Cb corresponds to a malfunction state in which the operation displacement Sp is relatively large, in the braking operation characteristic. This state is referred to as "first malfunction". For example, the first malfunction may occur in following situations.

a situation in which a gas (air and the like) is introduced into the input chamber Rn a situation in which leakage occurs at a seal member (seal with the supply fluid passage HU) on a drain-side of the reaction force chamber Ro a situation in which the second opening/closing valve VB is fixed in the opened position (i.e., the second opening/closing valve VB is not sufficiently closed)

A characteristic Cc corresponds to a malfunction state in which the operation displacement Sp is relatively small, in the braking operation characteristic. This state is referred to as "second malfunction". For example, the second malfunction may occur in following situations.

a situation in which leakage occurs at a seal member on a side of the reaction force chamber Ro facing toward the servo chamber Rs a situation in which the first opening/closing valve VA is fixed in the closed position (i.e., the first opening/closing valve VB is not sufficiently opened)

a situation in which the piston is fixed and is not smoothly slid in the simulator SS The first and second malfunctions may be determined based on detection results Sp and Ps (and/or, the input hydraulic pressure Pn) of the operation displacement sensor SP and the reaction force hydraulic pressure sensor PS (and/or, the input hydraulic pressure sensor PN) when the braking operation member BP is operated. Specifically, at least one of the reaction force hydraulic pressure Ps and the input hydraulic pressure Pn at a time when the operation displacement Sp becomes a predetermined value sp is compared. When the reaction force hydraulic pressure Ps (and/or, the input hydraulic pressure Pn) is within an appropriate range, an appropriate state is determined, and processing of step S200 (normal adjustment control), which will be described later, is executed. On the other hand, when the reaction force hydraulic pressure Ps (and/or, the input hydraulic pressure Pn) is outside of the appropriate range, a malfunction state is determined, and processing of step S400 (adjustment control upon malfunction), which will be described later, is execute.

<Actuation Mode Processing in Adjustment Control>

Figure 3:
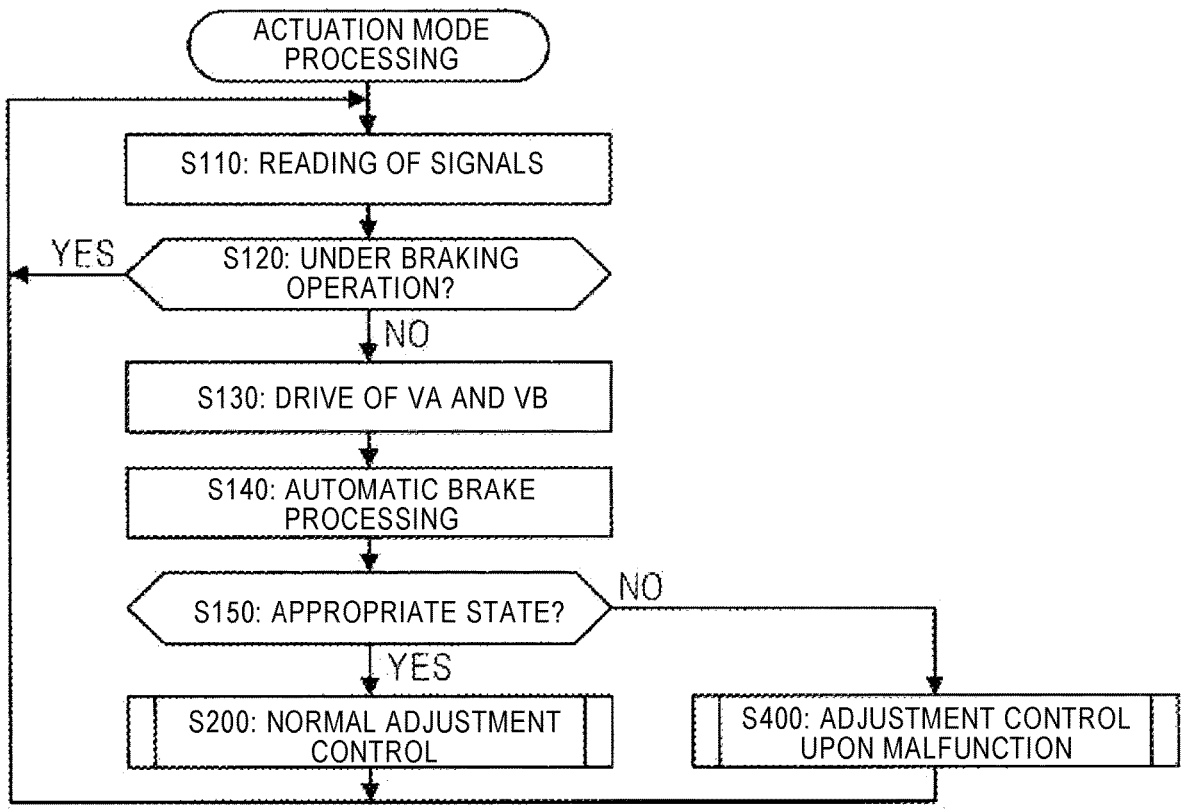
FIG. 3 is a control flow for illustrating actuation mode selection processing.

In the above, the suitability determination based on the detection values (Sp, Ps and the like) when the braking operation member BP is operated has been described. In the below, actuation mode processing of adjustment control including the suitability determination when the braking operation member BP is not operated is described with reference to a control flow of FIG. 3. The "adjustment control" is calculation processing for adjusting the adjustment hydraulic pressure Pc or the lower hydraulic pressure Pp in accordance with a driver's operation on the braking operation member BP. Also, the "actuation mode" is processing of selecting whether the braking control device SC is controlled by which of the adjustment hydraulic pressure (first hydraulic pressure) Pc and the lower hydraulic pressure (second hydraulic pressure) Pp.

In step S110, the diverse signals are read. Specifically, the operation displacement Sp, the operation signal St, the adjustment hydraulic pressure Pc, the reaction force hydraulic pressure Ps, and the input hydraulic pressure Pn are read. In step S120, it is determined whether "the braking operation is performed", based on at least one of the operation displacement Sp and the braking operation signal St. When it is determined that the braking operation is performed, the processing returns to step S110. When it is determined that the braking operation is not performed, the processing proceeds to step S130. For example, when the operation displacement Sp is equal to or greater than a predetermined value so, a result of the determination in step S120 is affirmative and the processing returns to step S110. On the other hand, when "Sp<so", a result of the determination in step S120 is negative and the processing proceeds to step S130. Herein, the predetermined value so is a preset constant corresponding to a play of the braking operation member BP. Also, when the operation signal St is off, the processing proceeds to step S130, and when the operation signal St is on, the processing returns to step S110.

In step S130, the normally closed first opening/closing valve VA and the normally open second opening/closing valve VB are driven. In step S140, the first electric motor MC and the first adjustment valve UC are driven, so that automatic brake processing is executed. In step S150, based on changes in the adjustment hydraulic pressure Pc, the reaction force hydraulic pressure Ps and the input hydraulic pressure Pn during the automatic braking, the suitability (whether the actuation is appropriate or not) of the braking control device SC (particularly, the master unit YM, the regenerative coordination unit YK, the first opening/closing valve VA and the second opening/closing valve VB) is determined.

When the actuation of the braking control device SC is appropriate and a result of the determination in step S150 is affirmative, the processing proceeds to step S200. In step S200, normal adjustment control is executed by the adjustment hydraulic pressure Pc (first hydraulic pressure). At this time, the actuation of the lower fluid unit YL (particularly, the electric motor ML and the charge valve UP) is stopped. Therefore, the braking hydraulic pressure Pw is adjusted only by the first adjustment unit YC.

On the other hand, when at least one of the master unit YM, the regenerative coordination unit YK, the first opening/closing valve VA and the second opening/closing valve VB malfunctions and a result of the determination in step S150 is negative, the processing proceeds to step S400. In step S400, adjustment control upon malfunction is executed by the lower hydraulic pressure Pp (second hydraulic pressure). At this time, the actuation of the first adjustment unit YC (particularly, the first electric motor MC and the first adjustment valve UC) is stopped, and the adjustment hydraulic pressure Pc (first hydraulic pressure) is adjusted to "0". Therefore, the lower hydraulic pressure (second hydraulic pressure) Pp is formed by the lower fluid unit YL (second adjustment unit), and the braking hydraulic pressure Pw is adjusted by the lower hydraulic pressure Pp.

The processing from step S140 to step S150, the normal processing in step S200, and the processing upon malfunction in step S400 will be described in detail later.

The processing from step S140 to step S150 (suitability determination processing) is initiated based on a signal Sv of a power switch (also referred to as "ignition switch"). Herein, the "power switch" is a switch for starting a power source such as an engine. For example, the suitability determination processing starts at a time (calculation period) when the power switch (ignition switch) becomes off, the switch signal Sv is changed from an on state to an off state, and a non-operation state of the braking operation member BP (i.e., the operation signal St is off or "St<so") is first satisfied.

The suitability determination processing may start at a time when a system is activated, in addition to the time when the power switch becomes off. Herein, the time when a system is activated is a time when the upper controller ECU is switched from an off state to an on state. For example, a system is activated based on an opening/closing signal of a door switch (i.e., a door is opened). Also, the system may be activated based on a time when the power switch in the off state becomes first on.

Based on a result of the suitability determination, two controls are switched. For this reason, the suitability determination processing is preferably executed before the braking operation member BP is operated. On the assumption that an operation on the braking operation member BP is not performed, the suitability determination processing starts when the power switch becomes on and/or when the system is activated. Since a result of the suitability determination is determined before the braking operation starts, a control switching during the braking operation can be avoided. As a result, the discontinuity in operation characteristic can be avoided, so that discomfort to the driver can be suppressed.

<First Processing Example of Suitability Determination>

Figure 4:
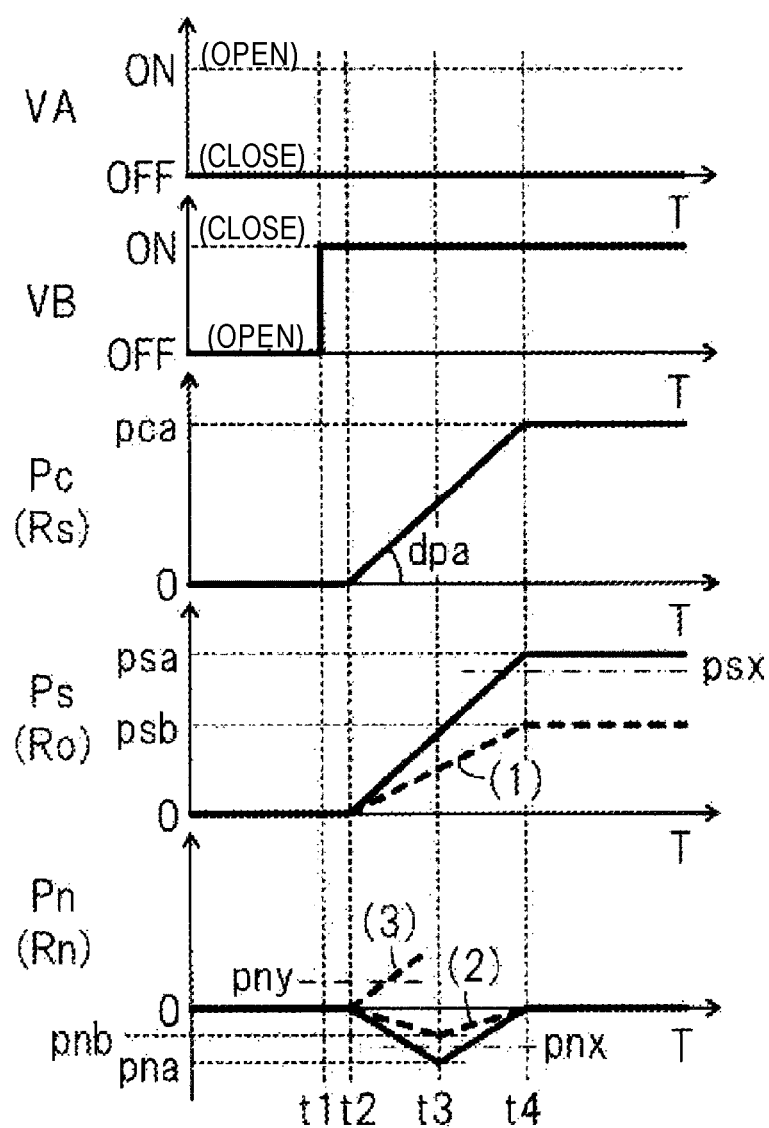

A first processing example of the suitability determination is described with reference to a time-series line diagram of FIG. 4.

Before first processing of the suitability determination starts (i.e., before time t1), the normally closed first opening/closing valve VA and the normally open second opening/closing valve VB are not energized. Also, the electric motor MC and the adjustment valve UC are not energized. Therefore, the adjustment hydraulic pressure Pc, the reaction force hydraulic pressure Ps and the input hydraulic pressure Pn are "0".

At time t1, the suitability determination processing is executed. First, at time t1, an instruction to energize the second opening/closing valve VB is made. At time t2 shortly after time t1, the automatic brake processing starts. That is, the electric motor MC and the adjustment valve UC are driven, and the adjustment hydraulic pressure Pc is increased from "0" with a preset pressure-increase gradient dpa. Then, at time t4, when the adjustment hydraulic pressure Pc becomes a predetermined value pca, the adjustment hydraulic pressure Pc is then constantly maintained.

When the actuation of the braking control device SC is appropriate, both the first opening/closing valve VA and the second opening/closing valve VB are located in the closed positions. The actuation corresponding to this case is shown with the solid line. The reaction force hydraulic pressure Ps is increased to a predetermined value psa corresponding to the predetermined value pca, in accordance with the increase in the adjustment hydraulic pressure Pc. Also, a negative pressure is generated in the input chamber Rn, and the input hydraulic pressure Pn becomes lower than the atmospheric pressure "=0".

When the actuation of the braking control device SC malfunctions, situations as shown with the broken lines (1) to (3) may occur.

(1) The increase in the reaction force hydraulic pressure Ps is insufficient (or does not increase at all) with respect to the increase in the adjustment hydraulic pressure Pc. For example, the situation is caused due to the leakage (seal defect) of the reaction force chamber Ro and the insufficient closing of the second opening/closing valve VB. In this case, the suitability determination (the determination in step S160) is determined appropriate when a predetermined threshold value psx corresponding to the predetermined value pca is set for the reaction force hydraulic pressure Ps and the reaction force hydraulic pressure Ps (=psa) is equal to or greater than the threshold value psx during the automatic brake processing, and is determined inappropriate when the reaction force hydraulic pressure Ps (=psb) is less than the threshold value psx.

(2) The negative pressure of the input hydraulic pressure Pn, which is to occur when the adjustment hydraulic pressure Pc increases (particularly, from time t2 to time t4), is small (or does not occur). For example, the situation is caused due to the introduction of the gas into the input chamber Rn and the seal leakage. In this case, the suitability determination (the determination in step S160) is determined appropriate when a predetermined threshold value pnx (a negative value) is set for the input hydraulic pressure Pn and the input hydraulic pressure Pn (=pna) is less than the threshold value pnx during the automatic brake processing, and is determined inappropriate when the input hydraulic pressure Pn (=pnb) is equal to or greater than the threshold value pnx.

(3) The input hydraulic pressure Pn increases with respect to the increase in the adjustment hydraulic pressure Pc. This is caused due to the insufficient closing of the first opening/closing valve VA, for example. The suitability determination is determined appropriate when a predetermined threshold value pny (a positive value) is set for the input hydraulic pressure Pn and the input hydraulic pressure Pn is less than the threshold value pny during the automatic brake processing, and is determined inappropriate when the input hydraulic pressure Pn is equal to or greater than the threshold value pny.

<Second Processing Example of Suitability Determination>

Figure 5:
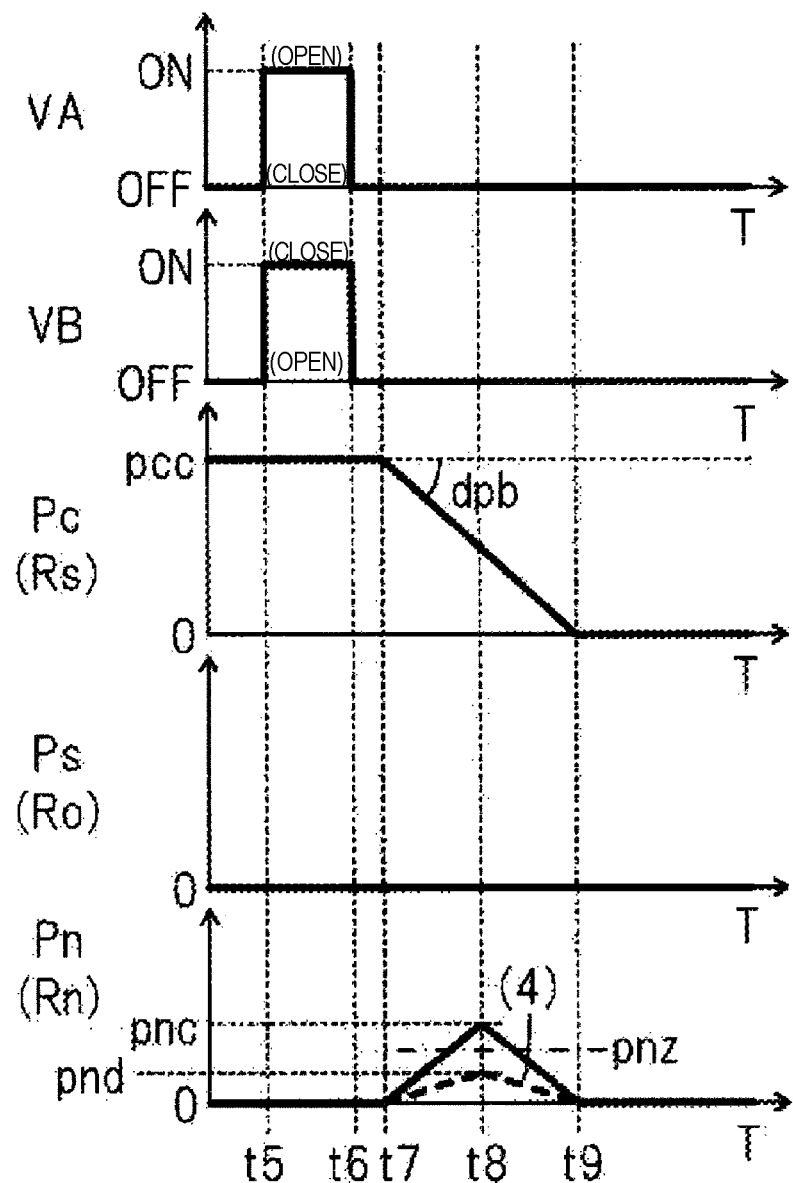

A second processing example of the suitability determination is described with reference to a time-series line diagram of FIG. 5. The first suitability determination processing is executed in the automatic brake processing in which the adjustment hydraulic pressure Pc increases from "0". Instead, the second suitability determination processing is executed when the adjustment hydraulic pressure Pc decreases from a predetermined value pcc toward "0".

Before the suitability determination processing starts (before time t5), the electric motor MC and the adjustment valve UC are driven so that the adjustment hydraulic pressure Pc is maintained at the predetermined value pcc. At this time, the normally closed first opening/closing valve VA and the normally open second opening/closing valve VB are not energized. Therefore, the first opening/closing valve VA is located in the closed position, the second opening/closing valve VB is located in the opened position, and both the reaction force hydraulic pressure Ps and the input hydraulic pressure Pn are "0". At time t5, an instruction to energize the first opening/closing valve VA and the second opening/closing valve VB is made. At time t6, an instruction to stop the energization to the first opening/closing valve VA and the second opening/closing valve VB is made. At time t7 shortly after time t6, the adjustment hydraulic pressure Pc is reduced from the predetermined value pcc with a preset pressure-reduction gradient dpb.

A case in which the actuation of the braking control device SC is appropriate is shown with the solid line. Since the second opening/closing valve VB is located in the opened position, the reaction force hydraulic pressure Ps is maintained at "0". On the other hand, since the first opening/closing valve VA is located in the closed position, the input hydraulic pressure Pn is increased to the predetermined value pnc in accordance with the decrease in the adjustment hydraulic pressure Pc.

When the actuation of the braking control device SC malfunctions, a situation as shown with the broken line (4) may occur.

(4) An amount of increase in the input hydraulic pressure Pn, which is to occur when the adjustment hydraulic pressure Pc is decreased (particularly, from time t7 to time t9), is reduced (or, the input hydraulic pressure Pn does not increase). The situation is caused due to the introduction of gas into the input chamber Rn, the seal leakage, and the like. In this case, the suitability determination (the determination in step S160) is determined appropriate when a predetermined threshold value pnz (a positive value) is set for the input hydraulic pressure Pn and the input hydraulic pressure Pn (=pnc) is equal to or greater than the threshold value pnz during the automatic brake processing, and is determined inappropriate when the input hydraulic pressure Pn (=pnd) is less than the threshold value pnz.

As described in the first and second processing examples of the suitability determination, in the automatic brake processing when the braking operation member BP is not operated, based on at least one of "the change in the reaction force hydraulic pressure Ps with respect to the change in the adjustment hydraulic pressure Pc" and "the change in the input hydraulic pressure Pn with respect to the change in the adjustment hydraulic pressure Pc", the malfunction state of at least one of the master unit YM, the regenerative coordination unit YK, the first opening/closing valve VA and the second opening/closing valve VB is determined. For example, during the execution of the automatic brake processing, the values (psb, pnb, pnd and the like) of the actually generated reaction force hydraulic pressure Ps and the input hydraulic pressure Pn are stored in the controller ECU, and are compared with the predetermined threshold values (psx, pnx, pny, pnz and the like) for suitability determination. By the above determinations, the introduction of gas into each unit, the seal defect and the electromagnetic valve malfunction can be appropriately determined.

Based on a result of the suitability determination, the two controls are switched (refer to the specific processing of step S200 and step S400 which will be described later). When the control switching is performed during the braking operation, the discontinuity in operation characteristic of the braking operation member BP may occur. For this reason, the first and second suitability determinations are not performed during the operation on the braking operation member BP. Before the operation on the braking operation member BP is started (i.e., before the braking operation), a result of the suitability determination is confirmed by the automatic brake (automatic pressurization) at a time of non-operation on the braking operation member BP. Thereby, the control switching during the braking operation is avoided, so that discomfort to the driver (discontinuity in operation characteristic) can be suppressed.

<Processing of Normal Adjustment Control>

Figure 6:
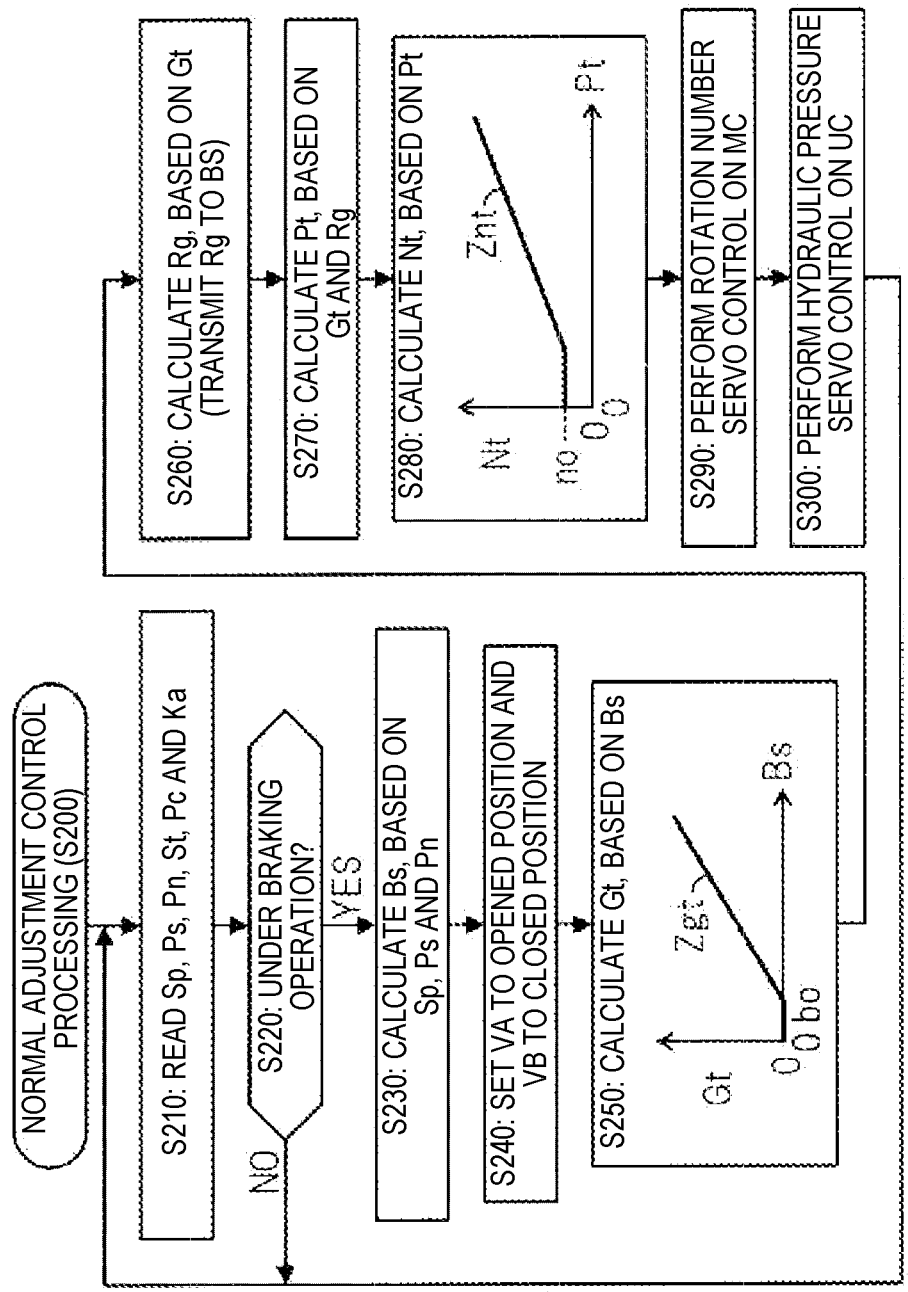
FIG. 6 is a control flow for illustrating processing of normal adjustment control in step S200.

The processing of the normal adjustment control shown in step S200 is described with reference to a control flow of FIG. 6. In the normal adjustment control, the braking control device SC is all actuated appropriately, and the braking hydraulic pressure Pw is adjusted by the adjustment hydraulic pressure Pc. In the meantime, the normal adjustment control is one of the control braking.

In step S210, the operation displacement Sp, the reaction force hydraulic pressure Ps, the input hydraulic pressure Pn, the operation signal St, the adjustment hydraulic pressure Pc and the rotation angle Ka are read. The operation displacement Sp is detected by the operation displacement sensor SP, the reaction force hydraulic pressure Ps is detected by the reaction force hydraulic pressure sensor PS, and the input hydraulic pressure Pn is detected by the input hydraulic pressure sensor PN. The operation signal St is detected by the operation switch ST provided to the braking operation member BP. The adjustment hydraulic pressure Pc is detected by the adjustment hydraulic pressure sensor PC provided to the adjustment fluid passage HC. The motor-rotation angle Ka is detected by the rotation angle sensor KA provided to the electric motor MC.

In step S220, it is determined whether the "braking operation is performed", based on at least one of the operation displacement Sp and the operation signal St. For example, when the operation displacement Sp is equal to or greater than the predetermined value so, a result of the determination in step S220 is affirmative, and the processing proceeds to step S230. On the other hand, when "Sp<so", a result of the determination in step S220 is negative, and the processing returns to step S210. Herein, the predetermined value so is a preset constant corresponding to a play of the braking operation member BP. Also, when the operation signal St is on, the processing proceeds to step S230, and when the operation signal St is off, the processing proceeds to step S210.

In step S230, a braking operating amount Bs is calculated based on the operation displacement Sp and an operating hydraulic pressure Po. The operating amount Bs is a state quantity (variable) corresponding to an operating amount of the braking operation member BP. Also, the operating hydraulic pressure Po is a hydraulic pressure that is generated in the regenerative coordination unit YK (particularly, the input chamber Rn and the simulator SS) in accordance with an operation on the braking operation member BP. The operating hydraulic pressure Po is calculated based on at least one of the input hydraulic pressure Pn and the reaction force hydraulic pressure Ps. Statically, the input hydraulic pressure Pn and the reaction force hydraulic pressure Ps match each other. However, the first opening/closing valve VA is arranged between the input hydraulic pressure sensor PN and the reaction force hydraulic pressure sensor PS. Since a valve seat hole of the first opening/closing valve VA functions as an orifice, the reaction force hydraulic pressure Ps is dynamically delayed with respect to the input hydraulic pressure Pn.

The input hydraulic pressure Pn and the reaction force hydraulic pressure Ps are weighted to calculate the operating hydraulic pressure Po. Specifically, the operating hydraulic pressure Po is calculated by a following equation (1).

$$Po = G \cdot Pn + (1-G) \cdot Ps \qquad \text{equation (1)}$$

herein, a weighting coefficient G is a value equal to or greater than "0" and equal to or less than "1", and indicates a weight (contribution ratio) of the hydraulic pressures Pn and Ps. For example, the weighting coefficient G may be set to "0.5". In this case, as the operating hydraulic pressure Po, an average value of the input hydraulic pressure Pn and the reaction force hydraulic pressure Ps is used. Also, the weighting coefficient G may be set to a value (0.7 to 0.8) greater than "0.5". As described above, the input hydraulic pressure Pn is more favorable in terms of responsiveness of the hydraulic pressure detection. Therefore, a weight of the input hydraulic pressure Pn may be set greater than a weight of the reaction force hydraulic pressure Ps. Thereby, the responsiveness of the operating hydraulic pressure Po is ensured, and robustness can also be ensured.

The weighting coefficient G may be determined based on an operating speed dS of the braking operation member BP. Herein, the operating speed dS is calculated based on the operation displacement Sp, i.e., by differentiating the same. The weighting coefficient G is preset so that it becomes greater as the operating speed dS increases. When the operating speed dS of the braking operation member BP is high, the input hydraulic pressure Pn is positively used to improve the responsiveness of the braking control device SC.

The braking operating amount Bs is calculated based on the operation displacement Sp and the operating hydraulic pressure Po. For example, in a region in which the operating amount of the braking operation member BP is small, the contribution ratio of the operation displacement Sp is increased and the contribution ratio of the operating hydraulic pressure Po is reduced, so that the braking operating amount Bs is calculated. On the other hand, in a region in which the operating amount is large, the contribution ratio of the operating hydraulic pressure Po is increased and the contribution ratio of the operation displacement Sp is reduced, so that the braking operating amount Bs is calculated. For example, the braking operating amount Bs is calculated by a following equation (2).

$$Bs = Kt \cdot K \cdot Sp + Kp \cdot (1-K) \cdot Po \qquad \text{equation (2)}$$

herein, conversion coefficients Kt and Kp are coefficients for converting the state quantities Sp and Po into specifications of the braking operating amount Bs. Also, the contribution ratio coefficient K is a coefficient indicative of a contribution ratio of each state quantity in the calculation of the operating amount Bs, and is a value equal to or greater than "0" and equal to or less than "1". In the calculation of the operating amount Bs, the operation displacement Sp is considered as the contribution ratio coefficient K. Also, the contribution ratio of the operating hydraulic pressure Po is considered as a coefficient "1-K". The contribution ratio coefficient K is determined as a relatively large value when the operation displacement Sp is small, and is preset so that it decreases as the operation displacement Sp increases.

In step S240, the normally closed first opening/closing valve VA and the normally open second opening/closing valve VB are energized. By the energization, the first opening/closing valve VA is located in the opened position, and the second opening/closing valve VB is located in the closed position. Thereby, the input hydraulic pressure chamber Rn and the reaction force hydraulic pressure chamber Ro are connected to each other. Also, the simulator SS is connected to the input chamber Rn and is disconnected from the reservoir RV.

In step S250, a target deceleration Gt is calculated based on the operating amount Bs. The target deceleration Gt is a target value of deceleration when decelerating the vehicle. The target deceleration Gt is determined as "0" in a range of the operating amount Bs from "0" to a predetermined value bo in accordance with a calculation map Zgt, and is calculated so that it monotonically increases from "0" as the operating amount Bs increases, in a range of the operating amount Bs beyond the predetermined value bo.

In step S260, an amount of regeneration Rg (target value) is determined based on the target deceleration Gt. For example, when the target deceleration Gt is less than a predetermined amount of regeneration rg, the amount of regeneration Rg (a value corresponding to a vehicle deceleration) is determined to match the target deceleration Gt. On the other hand, when the target deceleration Gt is equal to or greater than the predetermined amount of regeneration rg, the amount of regeneration Rg is determined to match the predetermined amount of regeneration rg. Herein, the predetermined amount of regeneration rg is preset as a constant. Also, the predetermined amount of regeneration rg may be set based on a state of the generator for regeneration GN or the accumulator BT. A calculation result ("Rg=Gt" or "Rg=rg") is transmitted from the upper controller ECU to the driving controller ECD via the communication bus BS. The controller ECD performs control on the generator GN so as to achieve the target value Rg.

In step S270, a first target hydraulic pressure Pt (a target value of the first hydraulic pressure Pc) is determined based on the target deceleration Gt and the amount of regeneration Rg. For example, when the target deceleration Gt is less than the predetermined amount of regeneration rg and "Rg=Gt", the target hydraulic pressure Pt is calculated as "0". That is, for the vehicle deceleration, the frictional braking is not adopted, and the target deceleration Gt is achieved only by the regenerative braking. When the target deceleration Gt is equal to or greater than the predetermined amount of regeneration rg, a value obtained by subtracting the predetermined amount of regeneration rg from the target deceleration Gt is converted into a hydraulic pressure, so that the first target hydraulic pressure Pt is calculated. That is, the target hydraulic pressure Pt is determined so that a part, which corresponds to the predetermined amount of regeneration rg, of the target deceleration Gt is achieved by the regenerative braking (a braking force generated by the generator GN) and the remaining ("Gt-rg") is achieved by the frictional braking (a braking force generated by friction between the rotary member KT and the friction material).

In step 280, a target number of rotations Nt is calculated based on the first target hydraulic pressure Pt. The target number of rotations Nt is a target value of the number of rotations of the first electric motor MC. The target number of rotations Nt is calculated so that it monotonically increases as the target hydraulic pressure Pt increases, in accordance with a calculation map Znt. As described above, the adjustment hydraulic pressure Pc is generated by an orifice effect of the adjustment valve UC. Since a slight flow rate is required so as to obtain the orifice effect, a predetermined lower limit rotation number no is provided for the target number of rotations Nt. The lower limit rotation number no is a minimum required value (preset constant) in generation of the hydraulic pressure. In the meantime, the target number of rotations Nt may be directly calculated based on the braking operating amount Bs. In any case, the target number of rotations Nt is determined based on the braking operating amount Bs.

In step S290, in the electric motor MC, servo control based on the number of rotations (control of causing the actual value to rapidly follow the target value) is executed. For example, as rotation number servo control, rotation number feedback control of the first electric motor MC is executed based on the target number of rotations Nt and an actual number of rotations Na. In step S290, the rotation angle Ka is time-differentiated based on the motor-rotation angle (detection value) Ka, so that a motor rotation speed (the actual number of rotations per unit time) Na is calculated. Then, the number of rotations of the electric motor MC is used as a control variable, so that an amount of energization (for example, supply current) to the electric motor MC is controlled. Specifically, the amount of energization to the electric motor MC is finely adjusted based on a deviation hN (=Nt−Na) between the target value Nt and the actual value Na of the number of rotations so that the deviation hN of the number of rotations becomes "0" (i.e., the actual value Na approaches the target value Nt). In a case of "hN>nx", the amount of energization to the electric motor MC is increased, so that the electric motor MC is speeded up. On the other hand, in a case of "hN<−nx", the amount of energization to the electric motor MC is reduced, so that the electric motor MC is speeded down. Herein, the predetermined value nx is a preset constant.

In step S300, in the first adjustment valve UC, servo control based on the hydraulic pressure is executed. For example, as hydraulic pressure servo control, hydraulic pressure feedback control of the adjustment valve UC is executed based on the first target hydraulic pressure Pt and the adjustment hydraulic pressure (first hydraulic pressure) Pc (a detection value of the first hydraulic pressure sensor PC). In the feedback control, the pressure Pc of the braking fluid BF in the adjustment fluid passage HC is used as a control variable, so that the amount of energization to the normally open linear adjustment valve UC is controlled. The amount of energization to the adjustment valve UC is adjusted based on a deviation hP (=Pt−Pc) between the target hydraulic pressure Pt and the adjustment hydraulic pressure Pc so that the hydraulic pressure deviation hP becomes "0" (i.e., the actual first hydraulic pressure Pc approaches the first target hydraulic pressure Pt). In a case of "hP>px", the amount of energization to the adjustment valve UC is increased, so that the opening amount of the adjustment valve UC is reduced. On the other hand, in a case of "hP<−px", the amount of energization to the adjustment valve UC is reduced, so that the opening amount of the adjustment valve UC is increased. Herein, the predetermined value px is a preset constant.

<Processing of Adjustment Control Upon Malfunction>

Figure 7:
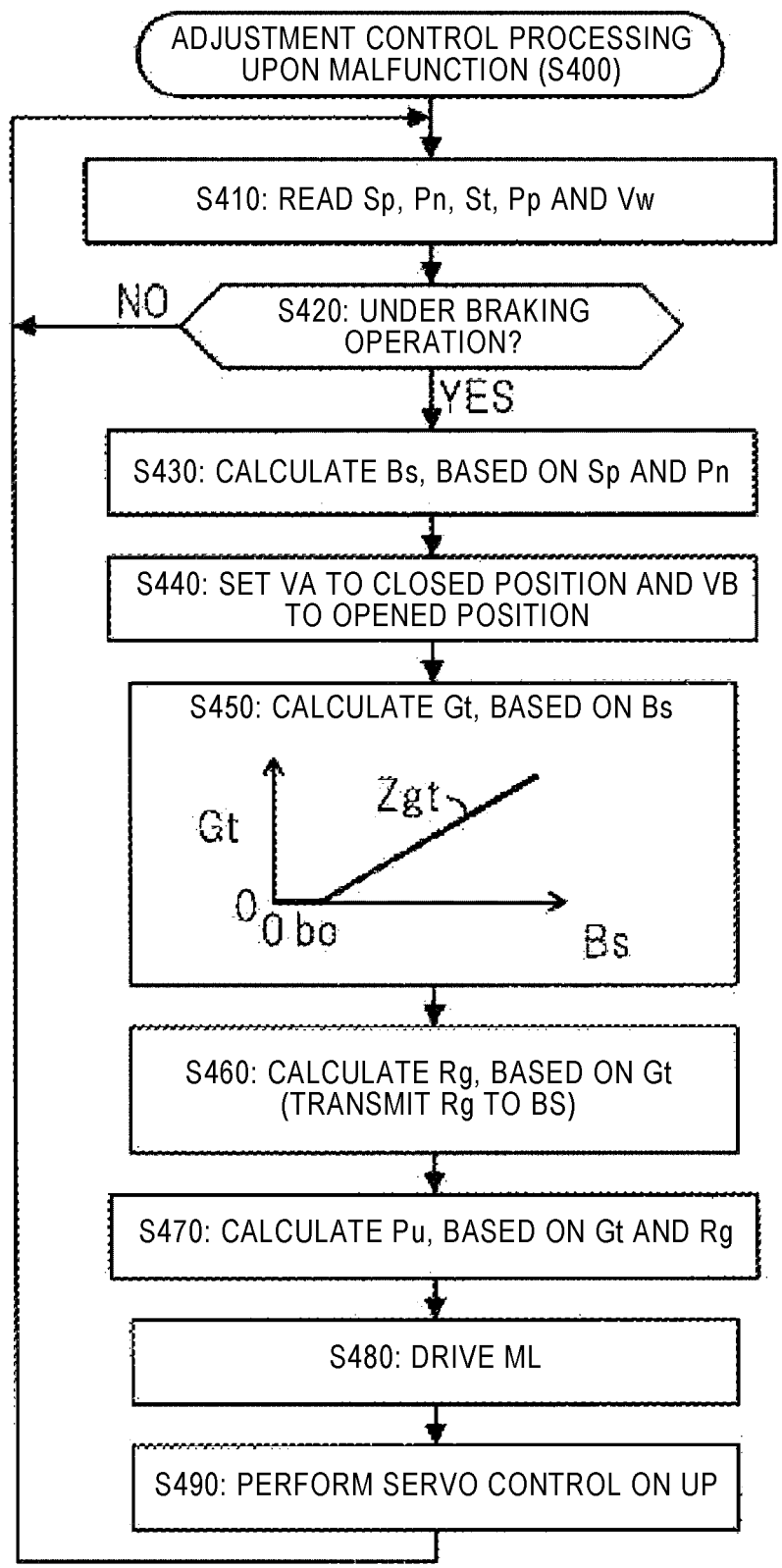
FIG. 7 is a control flow for illustrating processing of adjustment control upon malfunction in step S400.

The processing of the adjustment control upon malfunction in step S400 is described with reference to a control-flow of FIG. 7. The adjustment control upon malfunction is control that is executed when at least one of the master unit YM, the regenerative coordination unit YK, the first opening/closing valve VA and the second opening/closing valve VB malfunctions. In this case, for adjustment of the braking hydraulic pressure Pw, the first adjustment unit YC is not adopted, and the braking hydraulic pressure Pw is adjusted only by the lower fluid unit (second adjustment unit) YL. In the meantime, the adjustment control upon malfunction is one of the control braking.

In the below, differences from the normal adjustment control are mainly described.

In step S410, the operation displacement Sp, the input hydraulic pressure Pn, the operation signal St, the lower hydraulic pressure Pp, and the wheel speed Vw are read. The lower hydraulic pressure (second hydraulic pressure) Pp is detected by a lower hydraulic pressure sensor (second hydraulic pressure sensor) PP. The wheel speed Vw is detected by the wheel speed sensor VW provided to each wheel WH.

As with step S220, in step S420, it is determined whether the "braking operation is performed or not", based on at least one of the operation displacement Sp and the operation signal St. When a result of the determination in step S420 is affirmative, the processing proceeds to step S430. On the other hand, when a result of the determination in step S420 is negative, the processing returns to step S410.

In step S430, the braking operating amount Bs is calculated based on at least one of the operation displacement Sp and the input hydraulic pressure Pn. For example, in the equation (1), the operating hydraulic pressure Po is calculated as "G=1". Then, the operating hydraulic pressure Po (=Pn) is substituted into the equation (2), so that the operating amount Bs is calculated. In the adjustment control upon malfunction, the reaction force chamber Ro communicates with the reservoir RV, and the reaction force hydraulic pressure Ps is "0". For this reason, even though the reaction force hydraulic pressure sensor PS is normal, the reaction force hydraulic pressure Ps is not adopted for calculation of the operating hydraulic pressure Po. In the calculation of the operating amount Bs, the input hydraulic pressure Pn is considered, so that effectiveness of the brake in a region in which a braking operating amount is small is improved. For this reason, the input hydraulic pressure Pn is favorably used for the calculation of the operating amount Bs.

In step S430, the braking operating amount Bs may be calculated based on only the operation displacement Sp. In this case, in the equation (2), the operating amount Bs is calculated as "K=1". Also, in step S430, the braking operating amount Bs may be calculated based on only the input hydraulic pressure Pn. In this case, in the equations (1) and (2), the operating amount Bs is determined as "G=1 and K=0".

In step S440, the first opening/closing valve VA is located in the closed position, and the second opening/closing valve VB is located in the opened position. That is, the first opening/closing valve VA and the second opening/closing valve VB are not energized. The first opening/closing valve VA is located in the closed position, so that the input cylinder CN (input chamber Rn) is fluidly locked. Also, the second opening/closing valve VB is located in the opened position, so that the reaction force chamber Ro communicates with the reservoir RV. For this reason, the simulator SS does not function, and the reaction force hydraulic pressure Ps is maintained as "0". In the adjustment control upon malfunction, the operation characteristic of the braking operation member BP (a relation between the operating force Fp and the operation displacement Sp) is determined by stiffness of the braking device (stiffness of a caliper, stiffness of a friction material, stiffness of a braking piping and the like).

As with step S250 to step S270, in step S450, the target deceleration Gt is calculated based on the operating amount Bs and the calculation map Zgt. In step S460, the amount of regeneration Rg (target value) is determined based on the target deceleration Gt. In step S470, a second target hydraulic pressure Pu (a target value of the second hydraulic pressure Pp) is determined based on the target deceleration Gt and the amount of regeneration Rg. For example, when the target deceleration Gt is less than the predetermined amount of regeneration rg and "Rg=Gt", the second target hydraulic pressure Pu is calculated as "0". When the target deceleration Gt is equal to or greater than the predetermined amount of regeneration rg, a value obtained by subtracting the predetermined amount of regeneration rg from the target deceleration Gt is converted into a hydraulic pressure, so that the second target hydraulic pressure Pu is calculated.

In the adjustment control upon malfunction, since the input chamber Ro is fluidly locked, the input piston PK and the master piston PM are integrally moved. That is, a so-called "brake by wire" configuration is solved, so that the master cylinder hydraulic pressure Pm is generated even by the operating force Fp of the driver. For this reason, the second target hydraulic pressure Pu is calculated, considering an influence of the operating force Fp. Also, when the adjustment control upon malfunction is executed, the execution of the regenerative coordination control may be prohibited. In this case, the amount of regeneration Rg is determined as "0", and the target deceleration Gt is achieved by the second hydraulic pressure Pp and the operating force Fp of the driver. In the meantime, in a closed state of the first opening/closing valve VA, the input hydraulic pressure Pn is equivalent to the braking operating force Fp. For this reason, when the second electric motor ML is driven based on the input hydraulic pressure Pn, the effectiveness of the brake in a low operation region of the braking operation member BP can be improved.

In step S480, the second electric motor ML is driven by the lower controller ECL. The braking fluid BF is discharged from the upstream part Bo toward the downstream part Bp of the second adjustment valve (charge valve) UP by the second fluid pump QL, so that a reflux of the braking fluid BF is formed. When the charge valve UP is located in the opened position (a completely opened state) and a reflux path including the second fluid pump QL is not narrowed, the upper hydraulic pressure Pq and the lower hydraulic pressure Pp of the charge valve UP are substantially the same.

In step S490, in the charge valve (second adjustment valve) UP, servo control based on the hydraulic pressure (hydraulic pressure servo control) is executed based on the second target hydraulic pressure Pu. Specifically, the hydraulic pressure feedback control of the charge valve UP is executed based on the second target hydraulic pressure Pu and the lower hydraulic pressure (second hydraulic pressure) Pp (a detection value of the second hydraulic pressure sensor PP). In the feedback control, the lower hydraulic pressure Pp is used as a control variable, so that the amount of energization to the normally open linear charge valve UP is controlled. The amount of energization to the charge valve UP is adjusted based on a deviation hQ (=Pu−Pp) between the target hydraulic pressure Pu and the lower hydraulic pressure Pp so that the hydraulic pressure deviation hQ becomes "0" (i.e., the actual second hydraulic pressure Pp approaches the second target hydraulic pressure Pu). In a case of "hQ>pz", the amount of energization to the charge valve UP is increased, so that the opening amount of the charge valve UP is reduced. On the other hand, in a case of "hQ<-pz", the amount of energization to the charge valve UP is reduced, so that the opening amount of the charge valve UP is increased. Herein, the predetermined value pz is a preset constant.

The lower hydraulic pressure sensor PP may be omitted. In this case, in the control of the charge valve UP, slip servo control is executed by using deceleration slip of a wheel (also simply referred to as "wheel slip") Sw as a state variable. The servo control based on the wheel slip Sw is based on a proportional relation between the wheel slip Sw and the wheel braking force when the deceleration slip Sw of a wheel is not excessive (i.e., the wheel slip Sw is within a predetermined range). For example, as the wheel slip (state quantity) Sw, a deviation hV between the wheel speed Vw and the vehicle body speed Vx is used. Also, as the wheel slip Sw, a wheel slip ratio obtained by dividing the deviation hV by the vehicle body speed Vx may be adopted.

In step S490, the second target hydraulic pressure Pu is converted into a target slip Su. Also, an actual rear wheel slip Sw is calculated based on the wheel speed Vw and the vehicle body speed Vx. Then, the amount of energization to the charge valve (second adjustment valve) UP is adjusted so that the wheel slip Sw (actual value) approaches and matches the target slip Su (target value).

When at least one of the master unit YM, the regenerative coordination unit YK, the first opening/closing valve VA and the second opening/closing valve VB malfunctions, the operation characteristic may not be appropriately ensured by the simulator SS. For this reason, in the adjustment control upon malfunction, the simulator SS is not used, and as with the manual braking, the operation characteristic of the braking operation member BP is ensured by stiffness of the braking device (a brake caliper, a friction material, a braking piping and the like). Also, in the adjustment control upon malfunction, as a power source of the control braking, the lower fluid unit YL (particularly, the second electric motor ML) is used. That is, a driver's operation is assisted by the lower fluid unit YL. For this reason, the sufficient braking hydraulic pressure Pw corresponding to an operation on the braking operation member BP can be secured. Also, since the lower fluid unit YL is an existing device for vehicle stabilization control and the like, the redundancy of the braking control device SC can be secured without adding a new device.

<Second Embodiment of Braking Control Device SC for Vehicle>

Figure 8:
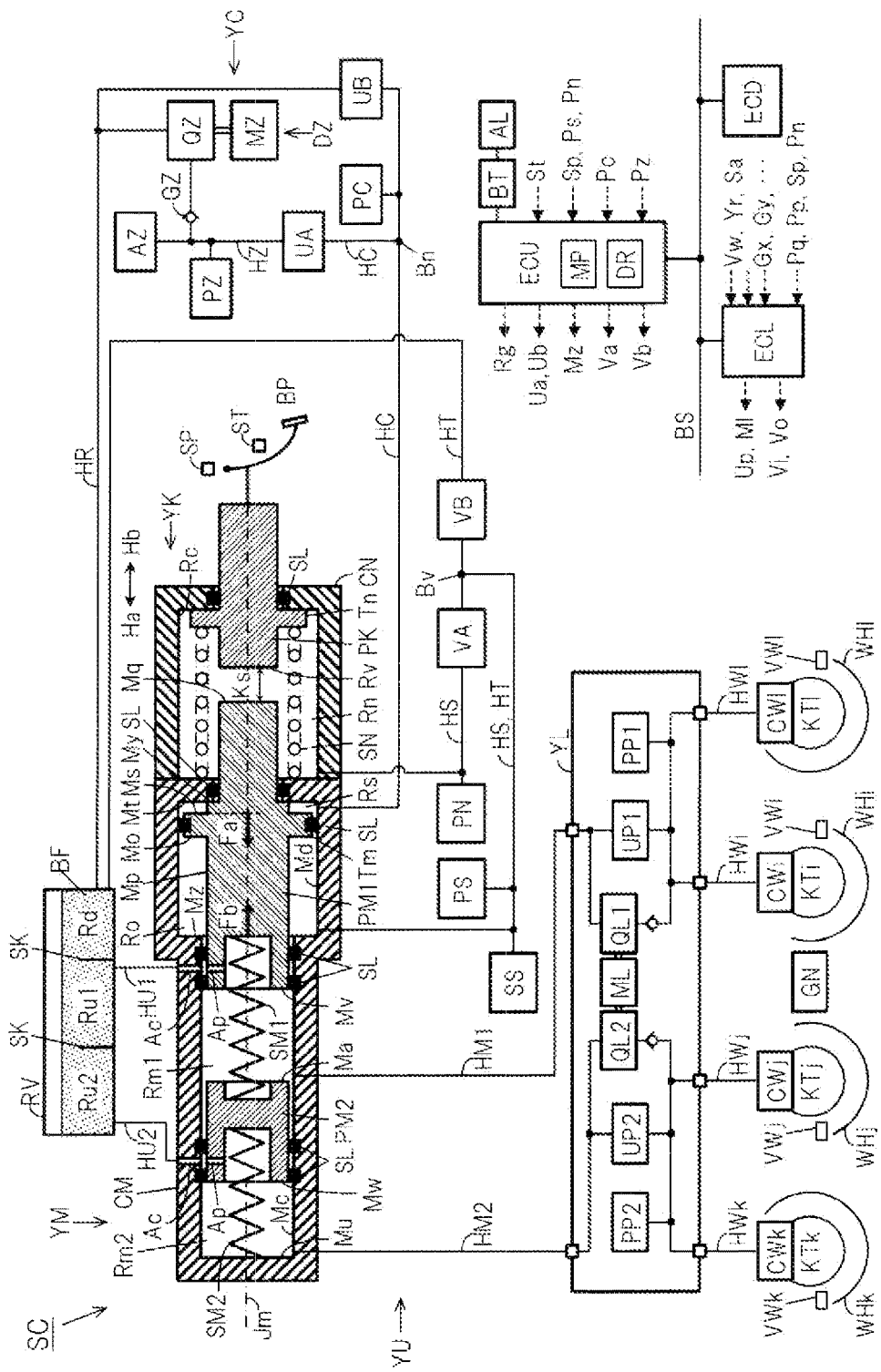
FIG. 8 is an overall configuration view for illustrating a second embodiment of the braking control device SC for a vehicle in accordance with the present disclosure.

A second embodiment of the braking control device SC for a vehicle in accordance with the present disclosure is described with reference to an overall configuration view of FIG. 8. As described above, a constitutional member, calculation processing, a signal, a characteristic and a value for which the same reference sign is added have the same function. Regarding the suffixes "i" to "l" added at the end of each reference sign, "i" indicates a right front wheel, "j" indicates a left front wheel, "k" indicates a right rear wheel, and "l" indicates a left rear wheel. The suffixes "i" to "l" at the ends of the signs may be omitted. In this case, each sign indicates a generic name of each of the four wheels. In addition, regarding the suffixes "1" and "2" added at the end of each sign, "1" indicates a first system of the two braking system, and "2" indicates a second system. The suffixes "1" and "2" at the ends of the signs may be omitted. In this case, each sign indicates a generic name of each of the two braking systems. In a case in which front and rear fluid passages are adopted, regarding the suffixes "f" and "r" added at the end of each sign, "f" indicates the front wheel system, and "r" indicates the rear wheel system. The suffixes "f" and "r" at the ends of the signs may be omitted. In this case, each sign indicates a generic name of each of the two braking systems. The braking that is performed by the braking control device SC is "control braking", and the braking that is performed only by a driver's operating force is "manual braking".

In the first embodiment, the single type master cylinder CM and the reflux type adjustment unit YC have been adopted. Also, as the two-system fluid passage, the front and rear fluid passages have been adopted. In the second embodiment, instead, a tandem type master cylinder CM is adopted, and an accumulator (referred to as "accumulator type") is used as the first adjustment unit YC. Also, as the two-system fluid passage, a so-called diagonal type (also referred to as "X type") is adopted. In the meantime, as the two-system fluid passage, a front and rear type (also referred to as "H type") is also possible. In the below, differences from the first embodiment are mainly described.

[Master Unit YM (Tandem Type)]

The master cylinder CM is a tandem type and an inside thereof is divided into first and second master cylinder chambers (first and second master chambers) Rm1 and Rm2 by first and second master pistons PM1 and PM2. An inside of the atmospheric pressure reservoir RV is partitioned into three parts Ru1, Ru2 and Rd by a partitioning plate SK. The first master reservoir chamber Ru1 is connected to the first master cylinder chamber Rm1, and the second master reservoir chamber Ru2 is connected to the second master cylinder chamber Rm2. Also, the adjustment reservoir chamber Rd is connected to the adjustment unit YC by the first reservoir fluid passage HR.

The first and second master chambers Rm1 and Rm2 are connected to first and second master cylinder fluid passages HM1 and HM2. The first master cylinder fluid passage HM1 is connected to the wheel cylinders CWi and CWl. Also, the second master cylinder fluid passage HM2 is connected to the wheel cylinders CWj and CWk. That is, as the two-system fluid passage, a diagonal type fluid passage is adopted.

In the first master chamber Rm1, a first master elastic body SM1 for applying an urging force in the backward direction Hb to the first master piston PM1 is provided. Also, in the second master chamber Rm2, a second master elastic body SM2 for applying an urging force in the backward direction Hb to the second master piston PM2 is provided. When the first and second master pistons PM1 and PM2 are located in positions in the most backward direction Hb (i.e., the initial position of the master piston PM), the master chambers Rm1 and Rm2 are connected to the reservoir RV (particularly, the master reservoir chamber Ru) via the supply fluid passage HU and the through-holes Ac and Ap. When the control braking starts, the adjustment hydraulic pressure Pc is introduced into the servo chamber Rs. When the forward force Fa by the servo chamber Rs becomes greater than attaching loads of the first and second master elastic bodies SM1 and SM2, the master piston PM starts to move in the forward direction Ha. By the forward movement of the master piston PM, the through-hole Ap enters the master chamber Rm, and the communication between the master chamber Rm and the master reservoir chamber Ru is cut off. Thereby, the master chamber Rm is in a liquid-tight state.

[Adjustment Unit YC (Accumulator Type)]

The adjustment hydraulic pressure Pc is adjusted by the adjustment unit YC. The adjustment unit YC is configured by an electric pump DZ, an accumulator AZ, an accumulator hydraulic pressure sensor (also referred to as "pressure-accumulation sensor") PZ, an increase adjustment valve UA, a decrease adjustment valve UB, and an adjustment hydraulic pressure sensor PC (first hydraulic pressure sensor). The adjustment unit YC is an "accumulator type" for which an accumulator is used.

The adjustment unit YC is provided with the pressure-accumulation electric pump DZ so that the pressurized braking fluid BF is to be accumulated in the accumulator AZ. The pressure-accumulation electric pump DZ is configured by a set of one pressure-accumulation electric motor MZ (corresponding to "first electric motor") and one pressure-accumulation fluid pump QZ. In the pressure-accumulation electric pump DC, the electric motor MZ and the fluid pump QZ are fixed to each other so that the electric motor MZ and the fluid pump QZ are to integrally rotate. The pressure-accumulation electric pump DZ (particularly, the pressure-accumulation electric motor MZ) is a power source for maintaining a hydraulic pressure (accumulator hydraulic pressure) Pz in the accumulator AZ to a high pressure. The pressure-accumulation electric motor (first electric motor) MZ is rotatively driven by the controller ECU. For example, as the electric motor MZ, a motor with a brush is adopted.

The braking fluid BF discharged from the pressure-accumulation fluid pump QZ is accumulated in the accumulator AZ. The accumulator AZ is connected to an accumulator fluid passage HZ, and the accumulator AZ and the increase adjustment valve UA are connected to each other. The accumulator fluid passage HZ is provided with a pressure-accumulation sensor PZ so as to detect a hydraulic pressure (accumulator hydraulic pressure) Pz accumulated in the accumulator AZ. The discharge part of the pressure-accumulation fluid pump QZ is provided with a check valve GZ so as to prevent the braking fluid BF from flowing back from the accumulator AZ.

The pressure-accumulation electric pump DZ (particularly, the pressure-accumulation electric motor MZ) is controlled by the controller ECU so that the accumulator hydraulic pressure Pz is to be maintained within a predetermined range. Specifically, when the accumulator hydraulic pressure Pz is less than a lower limit value (predetermined value) pl, the electric motor MZ is driven with a predetermined number of rotations. Also, when the accumulator hydraulic pressure Pz is equal to or greater than an upper limit value (predetermined value) pu, the electric motor MZ is stopped. Herein, the lower limit value pl and the upper limit value pu are preset predetermined constants, and meet a relation of "pl<pu". Therefore, the hydraulic pressure Pz in the accumulator AZ is maintained within a range from the lower limit value pl to the upper limit value pu.

The first adjustment unit YC is provided with a normally closed increase adjustment valve UA and a normally open decrease adjustment valve UB. The increase adjustment valve UA and the decrease adjustment valve UB are connected therebetween by the adjustment fluid passage HC. Also, the decrease adjustment valve UB is connected to the first reservoir fluid passage HR. The increase and decrease adjustment valves UA and UB are linear electromagnetic valves (proportional valves) of which opening amounts are continuously controlled based on amounts of energization (for example, supply current). The adjustment valves UA and UB are controlled by the upper controller ECU, based on drive signals Ua and Ub.

When adjusting the adjustment hydraulic pressure (first hydraulic pressure) Pc, the increase adjustment valve UA is energized, and the braking fluid BF is introduced from the accumulator AZ into the adjustment fluid passage HC via the accumulator fluid passage HZ. Also, based on the adjustment hydraulic pressure Pc (actual value), the decrease adjustment valve UB is energized, and the adjustment hydraulic pressure Pc is regulated. As with the first embodiment, the adjustment hydraulic pressure sensor PC is provided so as to detect the adjustment hydraulic pressure Pc.

A regenerative coordination unit YK and a lower fluid unit YL are similar to the first embodiment.

Also in the second embodiment, the input chamber Rn of the input cylinder CN is connected to the reaction force chamber Ro of the master unit YM via the reaction force chamber fluid passage HS (first fluid passage). The reaction force chamber fluid passage HS is provided with the first opening/closing valve VA (a normally closed two-position electromagnetic valve). The reaction force chamber fluid passage HS is provided with the simulator SS between the reaction force chamber Ro and the first opening/closing valve VA. The reaction force chamber Ro is connected to the reservoir RV (particularly, the adjustment reservoir chamber Rd) via the second reservoir fluid passage (second fluid passage) HT. The reservoir fluid passage HT is provided with the second opening/closing valve VB (a normally open two-position electromagnetic valve). The reaction force hydraulic pressure sensor PS is provided so as to detect the hydraulic pressure (reaction force hydraulic pressure) Ps in the reaction force chamber Ro. Also, the input hydraulic pressure sensor PN is provided so as to detect the hydraulic pressure (input hydraulic pressure) Pn in the input chamber Rn.

In the second embodiment, the lower fluid unit YL is connected to the first and second master cylinder fluid passages HM1 and HM2. As with, the first master cylinder fluid passage HM1 is provided with a first charge valve (second adjustment valve) UP1, and the second master cylinder fluid passage HM2 is provided with a second charge valve (second adjustment valve) UP2. Two second fluid pumps (lower fluid pumps) QL1 and QL2 that are driven by the lower electric motor (second electric motor) ML are provided. By the lower fluid pump QL, the braking fluid BF is sucked from an upstream part of the charge valve UP, and is discharged to a downstream part of the charge valve UP. Thereby, a reflux of the braking fluid BF is formed. Then, the charge valve UP is controlled and the lower hydraulic pressure Pp is adjusted, based on the second target hydraulic pressure Pu and the lower hydraulic pressure (second hydraulic pressure) Pp (detection values of the lower hydraulic pressure sensors PP1 and PP2). In the meantime, in the drawing, for simplification, the electromagnetic valves VI and VO, the low-pressure reservoir RL and the hydraulic pressure sensor PQ are not shown.

Also in the second embodiment, the suitability of the master unit YM, the regenerative coordination unit YK, the first opening/closing valve VA and the second opening/closing valve VB is determined by the automatic brake processing that is executed when the braking operation member BP is not operated. When all the elements are appropriately actuated, the control braking (normal adjustment control) is performed by the master unit YM, the regenerative coordination unit YK and the adjustment unit YC. On the other hand, in the control braking (adjustment control upon malfunction) that is executed when at least one of the master unit YM, the regenerative coordination unit YK, the first opening/closing valve VA and the second opening/closing valve VB malfunctions, the energization to the first opening/closing valve VA and the second opening/ closing valve VB is stopped, and pressurization assistance by the second lower fluid unit YL is executed using the second electric motor ML different from the first electric motor (pressure-accumulation motor) MZ. Also in the second embodiment, the similar effects to those of the first embodiment (securing redundancy, ensuring continuity of operation characteristic, and suppressing discomfort to the driver) are achieved.

<Another Configuration Example (Electric Cylinder Type) of First Adjustment Unit YC>

Figure 9:
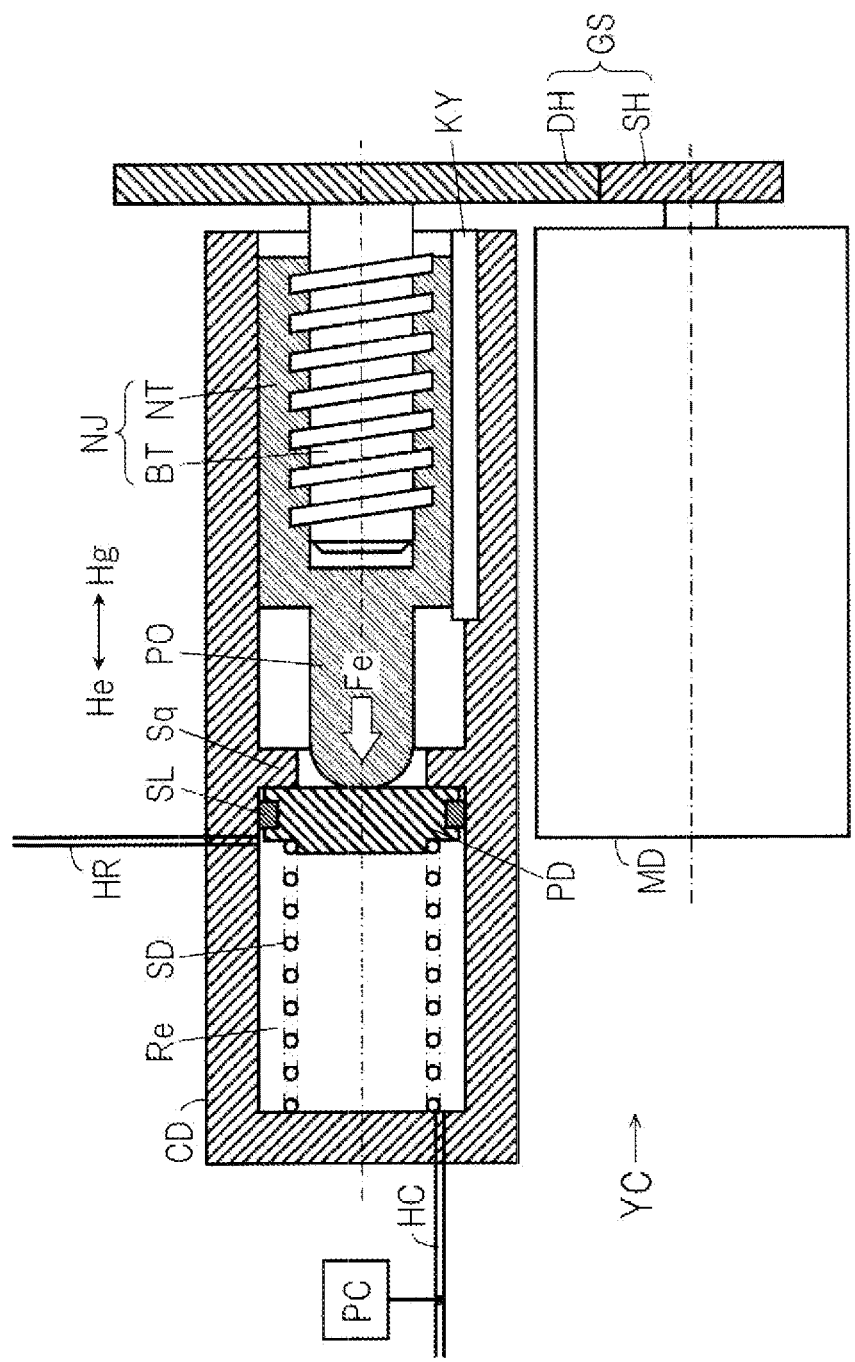
FIG. 9 is a schematic view for illustrating another configuration example of a first adjustment unit YC.

Another configuration example of the first adjustment unit YC is described with reference to a schematic view of FIG. 9. The reflux type adjustment unit YC has been described with reference to FIG. 1, and the accumulator type adjustment unit YC has been described with reference to FIG. 8. Instead, in a third configuration example of the adjustment unit YC, an adjustment piston PD provided in an adjustment cylinder CD is directly pressed by an electric motor MD for adjustment. Thereby, the adjustment hydraulic pressure (first hydraulic pressure) Pc is adjusted. This adjustment manner is referred to as "electric cylinder type". Meanwhile, in the electric cylinder type adjustment unit YC, the fluid pump and the adjustment valve are not used.

The first adjustment unit YC is configured by an electric motor for adjustment (equivalent to "first electric motor") MD, a decelerator GS, a rotation/linear motion conversion mechanism (screw mechanism) NJ, a pressing member PO, an adjustment cylinder CD, an adjustment piston PD, and a return elastic body SD.

The electric motor for adjustment (adjustment motor) MD is a power source by which the adjustment unit YC is to adjust (increase/decrease) the braking hydraulic pressure Pw. The adjustment motor (first electric motor) MD is driven by the upper controller ECU, based on a drive signal Md. For example, as the adjustment motor MD, a brushless motor may be adopted.

The decelerator GS is configured by a small-diameter gear SK and a large-diameter gear DK. A rotating power of the electric motor MD is decelerated by the decelerator GS and is then transmitted to the screw mechanism NJ. Specifically, the small-diameter gear SK is fixed to an output shaft of the electric motor MD. The large-diameter gear DK is in mesh with the small-diameter gear SK, and the large-diameter gear DK and a bolt member BT are fixed to each other so that a rotation axis of the large-diameter gear DK coincides with a rotation axis of the bolt member BT of the screw mechanism NJ. That is, in the decelerator GS, the rotating power from the electric motor MD is input to the small-diameter gear SK, which is in turn decelerated and output from the large-diameter gear DK to the screw mechanism NJ.

The rotating power of the decelerator GS is converted into a linear power Fe of the pressing member PO by the screw mechanism NJ. A nut member NT is fixed to the pressing member PO. The bolt member BT of the screw mechanism NJ is fixed coaxially with the large-diameter gear DK. Since rotation motion of the nut member NT is restrained by a key member KY, the nut member NT (i.e., the pressing member PO) screwed with the bolt member BT is moved in a direction of the rotation axis of the large-diameter gear DK by rotation of the large-diameter gear DK. That is, the rotating power of the adjustment motor MD is converted into the linear power Fe of the pressing member PO by the screw mechanism NJ.

The adjustment piston PD is moved by the pressing member PO. The adjustment piston PD is inserted into an inner hole of the adjustment cylinder CD, so that a combination of the piston and the cylinder is formed. Specifically, an outer periphery of the adjustment piston PD is provided with a seal SL, so that liquid tightness with the inner hole (cylindrical surface of an inside) of the adjustment cylinder CD is ensured. That is, a hydraulic pressure chamber (adjustment cylinder chamber) Re demarcated by the adjustment cylinder CD and the adjustment piston PD is formed.

In the adjustment cylinder chamber Re of the adjustment unit YC, the return elastic body (compression spring) SD is provided. When the energization to the adjustment motor MD is stopped, the adjustment piston PD is returned to an initial position (position corresponding to the braking hydraulic pressure "0") by the return elastic body SD. Specifically, a stopper part Sq is provided inside of the adjustment cylinder CD, and when an output of the adjustment motor MD is "0", the adjustment piston PD is pressed to a position (initial position), in which it is in contact with the stopper part Sq, by the return elastic body SD.

The adjustment cylinder chamber Re is connected to the adjustment fluid passage HC. The adjustment piston PD is moved in a direction of a central axis, so that a volume of the adjustment cylinder chamber Re is changed. Thereby, the adjustment hydraulic pressure (first hydraulic pressure) Pc is adjusted. Specifically, when the adjustment motor MD is rotatively driven in a forward rotation direction, the adjustment piston PD is moved in the forward direction (a leftward direction, in the drawing) He so that the volume of the adjustment cylinder chamber Re is decreased. Thereby, the adjustment hydraulic pressure Pc is increased, so that the braking fluid BF is discharged from the adjustment cylinder CD to the adjustment fluid passage HC. On the other hand, when the adjustment motor MD is rotatively driven in a reverse rotation direction, the adjustment piston PD is moved in the backward direction (a rightward direction, in the drawing) Hg so that the volume of the adjustment cylinder chamber Re is increased. Thereby, the adjustment hydraulic pressure Pc is reduced, so that the braking fluid BF is returned into the adjustment cylinder chamber Re via the adjustment fluid passage HC. The adjustment motor MD is driven in the forward or reverse direction, so that the adjustment hydraulic pressure Pc is adjusted (increased or reduced). As with the above, the adjustment fluid passage HC is provided with the adjustment hydraulic pressure sensor PC so as to detect the adjustment hydraulic pressure Pc.

The adjustment motor MD is controlled based on the first target hydraulic pressure Pt and the adjustment hydraulic pressure Pc (detection value). First, based on the first target hydraulic pressure Pt, the calculation is performed so that an instructed energization amount Is monotonically increases from "0" as the target hydraulic pressure Pt increases from "0". Then, based on a deviation hP between the target hydraulic pressure Pt and the adjustment hydraulic pressure Pc, a compensation energization amount Iu is calculated. In a case of "hP>py (predetermined value)", the compensation energization amount Iu is increased as a positive sign value (corresponding to the forward rotation direction of the adjustment motor MD), as the hydraulic pressure deviation hP increases. In a case of "hP<-py (predetermined value)", the compensation energization amount Iu is decreased as a negative sign value (corresponding to the reverse rotation direction of the adjustment motor MD), as the hydraulic pressure deviation hP decreases. In a case of "−py≤hP≤py", "Iu=0" is calculated. Herein, the predetermined value py is a preset constant.

Finally, a target energization amount It is determined based on the instructed energization amount Is and the compensation energization amount Iu. For example, the instructed energization amount Is and the compensation energization amount Iu are summed to calculate the target energization amount It. The target energization amount It is a target value of an amount of energization to the adjustment motor MD, and energization amount (current) feedback control is executed based on the target energization amount It and an actual energization amount Ia (detection value). Herein, the actual energization amount Ia is detected by an energization amount sensor (current sensor) IA provided to a drive circuit of the adjustment motor MD.

Operations/Effects

By the braking control device SC, the braking hydraulic pressure Pw of the braking fluid BF in the wheel cylinder CW provided to the wheel WH is adjusted in accordance with an operation on the braking operation member BP. The braking control device SC includes the first adjustment unit YC, the master unit YM, and the regenerative coordination unit YK. In the first adjustment unit YC, the hydraulic pressure generated by the first electric motor MC, MZ, and MD is adjusted to the first hydraulic pressure (adjustment hydraulic pressure) Pc. The master unit YM is configured by the master cylinder CM and the master piston PM. The master unit YM has the three hydraulic pressure chambers of "the master chamber Rm connected to the wheel cylinder CW", "the servo chamber Rs into which the first hydraulic pressure Pc is introduced", and "the reaction force chamber Ro in which the reaction force hydraulic pressure Ps corresponding to an operation on the braking operation member BP is generated". The regenerative coordination unit YK is configured by the input piston PK and the input cylinder CN. The input piston PK is connected to the braking operation member BP and is configured to operate in conjunction with the same. The input cylinder CN is fixed to the master cylinder CM. In the input cylinder CN, the gap Ks is formed between the master piston PM and the input piston PK. The gap Ks is controlled for the regenerative coordination control by the adjustment hydraulic pressure Pc. The first electric motor (MC and the like), the first opening/closing valve VA and the second opening/closing valve VB are controlled by the upper controller ECU.

The input cylinder CN and the reaction force chamber Ro are connected to each other by the reaction force chamber fluid passage (first fluid passage) HS. The first fluid passage HS is provided with the first opening/closing valve VA. The reaction force chamber Ro and the reservoir RV of the vehicle are connected to each other by the second reservoir fluid passage (second fluid passage) HT. The second fluid passage HT is provided with the second opening/closing valve VB. The reaction force hydraulic pressure sensor PS is provided so as to detect the hydraulic pressure Ps (reaction force hydraulic pressure) in the reaction force chamber Ro. The input hydraulic pressure sensor PN is provided so as to detect the hydraulic pressure Pn (input hydraulic pressure) in the input cylinder CN.

By the upper controller ECU, the suitability of at least one of the master unit YM, the regenerative coordination unit YK, the first opening/closing valve VA and the second opening/closing valve VB is determined based on the reaction force hydraulic pressure Ps and the input hydraulic pressure Pn. For example, when the braking operation member BP is not operated, the adjustment hydraulic pressure Pc is automatically increased or decreased and the controller ECU performs the suitability determination, based on the reaction force hydraulic pressure Ps and the input hydraulic pressure Pn at that time. Specifically, at a time of non-operation on the braking operation member BP, the first electric motor is driven to apply the automatic brake and the first opening/closing valve VA and the second opening/closing valve VB are appropriately driven. Based on the changes in the reaction force hydraulic pressure Ps and the input hydraulic pressure Pn at this time (the generated hydraulic pressures Ps and Pn are compared with the predetermined threshold values), the suitability determination is executed. Particularly, based on the change in the input hydraulic pressure Pn when it is instructed to set the first opening/closing valve VA to the closed position, the introduction of gas into the unit, the seal defect and the electromagnetic valve malfunction can be appropriately determined. In addition to this, since a result of the suitability determination is confirmed at a time of non-operation on the braking operation member BP, the control switching while the braking operation member BP is operated can be avoided. The continuity of the operation characteristic of the braking operation member BP is ensured, so that the discomfort to the driver can be avoided.

The braking control device SC is provided with the operation displacement sensor SP so as to detect the operation displacement Sp of the braking operation member BP. Also, the second adjustment unit (lower fluid unit) YL configured to adjust the hydraulic pressure that is generated by the second electric motor ML separate from the first electric motor (MC and the like) to the second hydraulic pressure Pp is provided. For example, as the second adjustment unit YL, a fluid unit for executing the vehicle stabilization control (so-called ESC) is used.

When the master unit YM, the regenerative coordination unit YK, the first opening/closing valve VA and the second opening/closing valve VB are all appropriate (normal), the first hydraulic pressure Pc is adjusted (formed) by the first adjustment unit YC, based on at least one (i.e., the operating hydraulic pressure Po) of the reaction force hydraulic pressure Ps and the input hydraulic pressure Pn and the operation displacement Sp. Then, the braking hydraulic pressure Pw is controlled by the first hydraulic pressure Pc. In this case, the energization to the lower fluid unit YL is stopped, so that the second electric motor ML and the like are not driven. That is, the second hydraulic pressure Pp is maintained at "0".

The reaction force chamber fluid passage HS between the input hydraulic pressure sensor PN and the reaction force hydraulic pressure sensor PS is provided with the first opening/closing valve VA. When the first opening/closing valve VA is in the opened state, the first opening/closing valve VA functions as an orifice. For this reason, when the operating speed on the braking operation member BP is high, the reaction force hydraulic pressure Ps is delayed with respect to the input hydraulic pressure Pn. Therefore, for adjustment of the first hydraulic pressure Pc, the input hydraulic pressure Pn is preferably used. Thereby, the responsiveness of the braking control device SC is improved.

On the other hand, when at least one of the master unit YM, the regenerative coordination unit YK, the first opening/closing valve VA and the second opening/closing valve VB is inappropriate (when some malfunctions), the second hydraulic pressure (lower hydraulic pressure) Pp is adjusted by the second adjustment unit YL, based on at least one of the input hydraulic pressure Pn and the operation displacement Sp. That is, for adjustment of the second hydraulic pressure Pp, the reaction force hydraulic pressure Ps is not adopted. Then, the braking hydraulic pressure Pw is controlled by the second hydraulic pressure Pp. In this case, the energization to the upper fluid unit YU (particularly, the first and second opening/closing valves VA and VB, the electric motor MC and the like) is stopped, so that the first opening/closing valve VA is located in the closed position and the second opening/closing valve VB is located in the opened position. Therefore, the first hydraulic pressure Pc becomes "0". Also, the input cylinder CN is fluidly locked, and the braking operation member BP and the wheel cylinder CW are connected to each other. The driver's braking operation is assisted by the second hydraulic pressure Pp. That is, the master cylinder hydraulic pressure Pm generated by the driver is increased by the second hydraulic pressure Pp.

The upper hydraulic pressure Pq detected by the upper hydraulic pressure sensor PQ matches the master cylinder hydraulic pressure Pm (in the first embodiment, the front wheel upper hydraulic pressure Pqf detected by the front wheel upper hydraulic pressure sensor PQf). Also, in the state in which the input chamber Rn is fluidly locked, the input hydraulic pressure Pn and the master cylinder hydraulic pressure Pm (=Pq) are equivalent to each other. In other words, the hydraulic pressures Pn and Pm can be converted into each other, based on a pressure-receiving area of the input chamber Rn and a pressure-receiving area of the master chamber Rm. When some malfunctions, the hydraulic pressures Pn and Pm indicate the operating force Fp. For this reason, when some malfunctions, the upper hydraulic pressure Pq may be used for the adjustment of the second hydraulic pressure Pp. As a result, when some malfunctions, robustness is improved and control accuracy of the braking control device SC can be ensured.

Even when the inappropriate state occurs, the control braking is not immediately stopped, and is not switched to the manual braking. The existing lower fluid unit YL is used, and the control braking (adjustment control upon malfunction) of assisting the driver's operation continues. That is, the redundancy of the braking control device SC is secured.

Other Embodiments

In the below, other embodiments are described. Also in the other embodiments, the above-described effects are achieved.

In the first embodiment, the configuration of "the single type master cylinder CM and the reflux type adjustment unit YC" (refer to FIG. 1) has been exemplified. In the second embodiment, the configuration of "the tandem type master cylinder CM and the accumulator type adjustment unit YC" (refer to FIG. 8) has been exemplified. Also, as the adjustment unit YC, the configuration of "the electric cylinder type adjustment unit YC" (refer to FIG. 9) has been exemplified. The respective constitutional elements can be freely combined. Therefore, as the configuration of the braking control device SC, one of six sets shown in Table 1 is adopted. In the meantime, when the single type master unit YM is adopted, the front and rear fluid passages are adopted. On the other hand, in the case of the tandem type master unit YM, as the two-system fluid passage, any one of the diagonal type and the front and rear type can be adopted.

TABLE 1

| No | Master unit YM | Adjustment unit YC |
|---|---|---|
| 1 | Single type | Reflux type |
| 2 | (front and rear type fluid passages) | Accumulator type |
| 3 | | Electric cylinder type |
| 4 | Diagonal type | Reflux type |
| 5 | (diagonal type or front and rear type | Accumulator type |
| 6 | fluid passage) | Electric cylinder type |

In the above embodiment, the vehicle is an electric vehicle or hybrid vehicle having a driving motor. Instead, the braking control device SC can also be applied to a vehicle having a general internal combustion engine with no driving motor (a gasoline engine and a Diesel engine). The braking control device SC is also suitable for a vehicle required to have a highly responsive collision damage reducing brake (so-called, AEB) because the responsiveness of the braking hydraulic pressure Pw is high. In a vehicle with no generator GN, the regenerative braking is not generated. Therefore, in the braking control device SC, the regenerative coordination control is not required and is not executed. That is, the vehicle is decelerated only by the frictional braking by the braking control device SC. In the meantime, in the adjustment control, the control is executed as "Gt=Rg=0".

In the above embodiment, for the linear adjustment valve UC, UA, UB, and UP, a valve of which an opening amount is adjusted in accordance with the energization amount is adopted. For example, the adjustment valve UC, UA, UB, and UP is the on/off valve. However, a valve of which opening and closing are controlled with a duty ratio and a hydraulic pressure is linearly controlled is also possible.

In the above embodiment, the configuration of the disc type braking device (disc brake) has been exemplified. In this case, the friction member is a brake pad, and the rotary member is a brake disc. Instead of the disc type braking device, a drum type braking device (drum brake) may also be adopted. In the case of the drum brake, a brake drum is adopted, instead of the caliper. Also, the friction member is a brake shoe, and the rotary member is a brake drum.

In the above embodiment, the upper fluid unit YU and the lower fluid unit YL are configured as separate elements. The upper fluid unit YU and the lower fluid unit YL may be integrally configured. In this case, the lower controller ECL is included in the upper controller ECU.

The invention claimed is:

1. A braking control device for a vehicle configured to adjust a braking hydraulic pressure of a braking fluid in a wheel cylinder provided to a wheel of the vehicle in accordance with an operation on a braking operation member of the vehicle, the braking control device comprising:
a first adjustment unit configured to adjust a hydraulic pressure generated by a first electric motor to a first hydraulic pressure;
a master unit including a master cylinder, a master piston, a master chamber connected to the wheel cylinder, a servo chamber into which the first hydraulic pressure is introduced, and a reaction force chamber in which a reaction force hydraulic pressure corresponding to an operation on the braking operation member is generated;
a regenerative coordination unit including an input piston which is configured to operate in conjunction with the braking operation member and an input cylinder fixed to the master cylinder, and a gap between the master piston and the input piston being controlled by the first hydraulic pressure;

a first opening/closing valve provided in a first fluid passage configured to interconnect the input cylinder and the reaction force chamber;

a second opening/closing valve provided in a second fluid passage configured to interconnect the reaction force chamber and a reservoir of the vehicle;

a reaction force hydraulic pressure sensor configured to detect a hydraulic pressure in the reaction force chamber as a reaction force hydraulic pressure;

an input hydraulic pressure sensor configured to detect a hydraulic pressure in the input cylinder as an input hydraulic pressure; and a controller configured to control the first electric motor, the first opening/closing valve, and the second opening/closing valve, wherein the controller is configured to determine, based on the reaction force hydraulic pressure and the input hydraulic pressure, whether at least one of the master unit, the regenerative coordination unit, the first opening/closing valve, and the second opening/closing valve is operating properly.

2. The braking control device for a vehicle according to claim 1, further comprising:

a displacement sensor configured to detect an operation displacement of the braking operation member, and a second adjustment unit configured to adjust a hydraulic pressure, which is generated by a second electric motor separate from the first electric motor, to a second hydraulic pressure, wherein in a case where the master unit, the regenerative coordination unit, the first opening/closing valve, and the second opening/closing valve are all operating properly, the first adjustment unit adjusts the first hydraulic pressure, based on at least one of the reaction force hydraulic pressure and the input hydraulic pressure and the operation displacement, and controls the braking hydraulic pressure by the first hydraulic pressure, and wherein in a case where at least one of the master unit, the regenerative coordination unit, the first opening/closing valve, and the second opening/closing valve is not operating properly, the second adjustment unit adjusts the second hydraulic pressure, based on at least one of the operation displacement and the input hydraulic pressure, and controls the braking hydraulic pressure by the second hydraulic pressure.

* * * * *